United States Patent
Bharadwai et al.

(10) Patent No.: US 7,416,692 B2
(45) Date of Patent: Aug. 26, 2008

(54) PROCESS AND APPARATUS FOR MICROREPLICATION

(75) Inventors: Rishikash K. Bharadwai, Chino Hills, CA (US); Eng-Pi Chang, Arcadia, CA (US); Philip Yi Zhi Chu, Monrovia, CA (US); Hsiao Ken Chuang, Arcadia, CA (US); David N. Edwards, La Canada-Flintridge, CA (US); Robert J. Fermin, La Verne, CA (US); Ali R. Mehrabi, Glendale, CA (US); Reza Mehrabi, Tujunga, CA (US); Ronald F. Sieloff, Chardon, OH (US); Chunhwa Wang, Diamond Bar, CA (US)

(73) Assignee: Avery Dennison Corporation, Pasadena, CA (US)

( * ) Notice: Subject to any disclaimer, the term of this patent is extended or adjusted under 35 U.S.C. 154(b) by 207 days.

(21) Appl. No.: 11/047,300

(22) Filed: Jan. 31, 2005

(65) Prior Publication Data
US 2005/0167863 A1  Aug. 4, 2005

Related U.S. Application Data

(63) Continuation of application No. 10/634,104, filed on Aug. 4, 2003, now abandoned.

(60) Provisional application No. 60/400,755, filed on Aug. 2, 2002, provisional application No. 60/438,194, filed on Jan. 6, 2003.

(51) Int. Cl.
B29C 59/02 (2006.01)
B29C 59/04 (2006.01)
B29C 59/16 (2006.01)
B29C 71/04 (2006.01)

(52) U.S. Cl. ............. 264/446; 264/210.2; 264/284; 264/293; 264/448; 264/464; 264/476; 264/480; 264/481

(58) Field of Classification Search ........... 264/446, 264/481, 293, 319, 210.2, 284, 448, 464, 264/476, 480
See application file for complete search history.

(56) References Cited

U.S. PATENT DOCUMENTS

| 3,811,983 A | 5/1974 | Rowland |
| 3,895,153 A | 7/1975 | Johnston et al. |
| 4,048,269 A | 9/1977 | Wisotzky et al. |

(Continued)

FOREIGN PATENT DOCUMENTS

| DE | 4240938 | 6/1994 |
| DE | 101 20 269 | 7/2002 |
| JP | 2002/090540 | 3/2002 |

(Continued)

OTHER PUBLICATIONS

Jagt, et al. 45.3: Micro-structured Polymeric Linearly Polarized Light Emitting Lightguide for LCD Illumination. 1236 SID 02 Digest (2002).

Pease, Fabian R. "Imprints offer Moore." in Nature (2002), vol. 417, pp. 802-803.

(Continued)

*Primary Examiner*—Leo B Tentoni
(74) *Attorney, Agent, or Firm*—Renner, Otto, Boisselle & Sklar, LLP

(57) ABSTRACT

A method of embossing a sheet material includes: heating at least a portion of the sheet directly or indirectly with radiant energy from a radiant energy source; pressing a tool against the heated portion of the sheet, thereby patterning a surface of the sheet; and separating the sheet and the tool. The radiant energy may travel through a solid material that is relatively transparent to radiation, on its way to being absorbed by a relatively-absorptive material. The relatively-transparent material may be an unheated portion of the sheet, and the relatively-absorptive material may be either the tool or the heated portion of the sheet. Alternatively, the relatively-transparent material may be the tool, and the relatively-absorptive material may be all or part of the sheet. The method may be performed as one or more roll-to-roll operations.

47 Claims, 17 Drawing Sheets

U.S. PATENT DOCUMENTS

| | | | |
|---|---|---|---|
| 4,332,847 | A | 6/1982 | Rowland |
| 4,478,769 | A | 10/1984 | Pricone et al. |
| 4,486,363 | A | 12/1984 | Pricone et al. |
| 4,525,413 | A | 6/1985 | Rogers et al. |
| 4,601,861 | A | 7/1986 | Pricone et al. |
| 4,919,741 | A | 4/1990 | Chirhart et al. |
| 4,925,714 | A | 5/1990 | Freedman |
| 5,045,342 | A | 9/1991 | Boissevain et al. |
| 5,328,653 | A | 7/1994 | Hyde et al. |
| 5,422,756 | A | 6/1995 | Weber |
| 5,451,356 | A * | 9/1995 | Hebert .................. 264/163 |
| 5,729,311 | A | 3/1998 | Broer et al. |
| 5,771,328 | A | 6/1998 | Wortman et al. |
| 5,843,562 | A | 12/1998 | Garrett et al. |
| 5,845,035 | A | 12/1998 | Wimberger-Friedl |
| 5,932,150 | A | 8/1999 | Lacey |
| 5,945,042 | A * | 8/1999 | Mimura et al. .............. 264/1.6 |
| 6,007,888 | A * | 12/1999 | Kime .................. 428/64.1 |
| 6,096,247 | A | 8/2000 | Ulsh et al. |
| 6,193,898 | B1 * | 2/2001 | Kano et al. .................. 216/23 |
| 6,280,808 | B1 | 8/2001 | Fields et al. |
| 6,322,236 | B1 | 11/2001 | Campbell et al. |
| 6,432,527 | B1 | 8/2002 | Perez et al. |
| 6,514,597 | B1 | 2/2003 | Strobel et al. |
| 2002/0037393 | A1 | 3/2002 | Strobel et al. |
| 2002/0052160 | A1 | 5/2002 | Hill et al. |
| 2002/0080598 | A1 | 6/2002 | Parker et al. |
| 2004/0130057 | A1 | 7/2004 | Mehrabi et al. |

FOREIGN PATENT DOCUMENTS

| | | |
|---|---|---|
| WO | 00/07046 | 2/2000 |
| WO | 01/90637 | 11/2001 |
| WO | 01/93066 | 12/2001 |
| WO | 02/37580 | 5/2002 |
| WO | 02/48607 | 6/2002 |
| WO | 02068189 | 9/2002 |

OTHER PUBLICATIONS

Chou, Stephen Y., et al. "Ultrafast and direct imprint of nanostructures in silicon." in Nature (2002), vol. 417, pp. 835-837.

Claims from U.S. Appl. No. 11/176,435, filed Jul. 7, 2005.

European Search Report from corresponding Patent Application No. EP 03 79 6292.

\* cited by examiner

PROCESS AND APPARATUS FOR MICROREPLICATION

This application is a continuation of U.S. application Ser. No. 10/634,104, filed Aug. 4, 2003, now abandoned, which claims the benefit under 35 USC 119(e) of U.S. Provisional Application No. 60/400,755, filed Aug. 2, 2002, and of U.S. Provisional Application 60/438,194, filed Jan. 6, 2003. All of the above applications are herein incorporated by reference in their entireties.

TECHNICAL FIELD

The present invention relates to a process and apparatus for embossing material with precise detail, and more particularly, to a process and apparatus for making products having surfaces with precision microstructures. The invention also pertains to sheeting, such as synthetic resinous sheeting, especially adapted for use with said process and apparatus.

BACKGROUND OF THE RELATED ART

Processes and apparatus for embossing precision optical patterns such as microcubes, in a resinous sheet or laminate, are well known as referenced in U.S. Pat. Nos. 4,486,363; 4,478,769; 4,601,861; 5,213,872; and 6,015,214, which patents are all incorporated herein by reference. In the production of such synthetic resin optical sheeting, highly precise embossing is required because the geometric accuracy of the optical elements determines its optical performance. The above referenced patents disclose particular methods and apparatus for continuously embossing a repeating retro-reflective pattern of fine or precise detail on one surface of a transparent thermoplastic material film to form the surface of the film into the desired microstructure pattern.

Besides precision optical sheeting, various other applications have been developed requiring the formation of highly precise shapes and structures in resinous film. Such applications include (in addition to optical applications) micro-fluidic, micro-electrical, micro-acoustic, and micro-mechanical applications. Such applications require the embossing of thermoplastic material to provide precisely formed functional geometric elements, or arrays of such functional geometric elements on the film surface.

These geometric elements, or precision microstructures, are defined by any or all of the following characteristics: precise embossing depths; flat surfaces with precise angular orientation; fine surface smoothness; sharp angular features with a very small radius of curvature; and precise dimensions of the elements and/or precise separation of the elements, within the plane of the film. The precise nature of the formed surface is critical to the functional attributes of the formed products, whether used for microcubes or other optical features; or as channels for microfluidics, or in fuel cells; or for accurate dimensions, flatness and spacing when providing a surface for holding nanoblocks in fluidic self assembly (FSA) techniques; or imparting a microtextured surface that is not optically smooth.

U.S. patents describing some uses of precise microstructures include: U.S. Pat. Nos. 4,486,363; 6,015,214 (microcubes); U.S. Pat. Nos. 5,783,856; 6,238,538 (microfluidics); and U.S. Pat. No. 6,274,508 (FSA).

As described in some of the above mentioned patents, such as U.S. Pat. Nos. 4,486,363, 4,601,861, and 4,478,769, embossed microstructure film may be made on a machine that includes two supply reels, one containing an unprocessed film of thermoplastic material, such as acrylic or polycarbonate, or even vinyl, and the other containing a transparent and optically smooth plastic carrier film such as Mylar, which should not melt or degrade during the embossing process. These films are fed to and pressed against a heated embossing tool that may take the form of a thin endless flexible metal belt. The belt creates the desired embossed pattern on one surface of the thermoplastic film, and the carrier film makes the other surface of the thermoplastic film optically smooth.

The belt moves around two rollers that advance the belt at a predetermined linear controlled speed or rate. One of the rollers is heated and the other roller is cooled. An additional cooling station, e.g. one that blows cool air, may be provided between the two rollers. Pressure rollers are arranged about a portion of the circumference of the heated roller. Embossing occurs on the web as it and the tool pass around the heated roller and while pressure is applied by one or more pressure rollers causing the film to be melted and pressed onto the tool. A backing film such as Mylar® may be used in order to create an optically smooth surface on the non-embossed surface of the film. The embossed film, (which may have been laminated to other films during the embossing process), is cooled, monitored for quality and then moved to a storage winder. At some point in the process, the Mylar® film may be stripped away from the embossed film.

The prior apparatus and process work well to produce rolls of film that are effectively 48" (122 cm) wide (52"/132 cm at salvage), but such equipment and processes have several inherent disadvantages. The process speed (and thus the volume of material) is limited by the time needed to heat, mold and freeze the film. Also, the pressure surface area and thus the time available to provide adequate pressure by the pressure rollers, and then cooling the material, impose certain special constraints.

The prior apparatus and process of U.S. Pat. Nos. 4,486,363, 4,601,861, and 4,478,769, and other embossing processes discussed below, depend on heating a preformed synthetic resinous sheeting above its glass transition temperature or melting temperature in order to emboss the sheeting while in a molten state. The embossing apparatus includes a heated roller with internal passages for circulation of hot oil. Typical temperatures of the heated roller are 425° C. to 475° C., possibly as high as 500° C. U.S. Pat. No. 4,486,363 also includes a limited disclosure (without explanatory details) of an alternative embodiment using an infrared heater or other radiant heater.

One earlier prior device for forming microcubes while in a planar condition is illustrated in U.S. Pat. No. 4,332,847, and involves indexing of small (9"×9" or 22.86 cm×22.86 cm) individual molds at a relatively slow speed (See Col. 11, lines 31-68). That process is not commercially practical because of its perceived inability to accurately reproduce microstructures because of indexing mold movement and the relatively small volume (caused by mold size) and speed. Also, the equipment and process is non-continuous. The '847 patent discloses the use of platens that are heated by electric cartridge heaters, as well as platens that are heated using hot oil.

U.S. Pat. No. 5,945,042 discloses an embossing apparatus in which synthetic resin sheeting is fed to a thermoforming zone while in a "flow temperature region" of the resinous material; this can be accomplished by extruding molten resinous sheeting to feed to the thermoforming zone, or by pre-heating preformed resinous sheeting. The '042 Patent discloses, as to means for pre-heating the resinous sheeting, passing the sheeting between two heated rollers. It is said that "indirect heating devices such as a hot blast heater, a near-infrared lamp heater and a far-infrared lamp heaters may be used in combination". The '042 patent also discloses heating the thermoforming roll from within using dielectric heaters or using a heated circulating medium. This heat source during thermoforming can be supplemented by "auxiliary means . . . such as a hot blast heater, a near-infrared lamp heater and a far-infrared lamp heater". No specifics are given as to these heat sources and their operation in heating the sheeting.

U.S. Pat. No. 6,096,247 discloses a process and apparatus for making an embossed optical polymer film. A heat flux is provided by either a flame burner or a flameless radiant burner to soften at least one surface of a polymer film. The film then is passed through an embossing nip to form embossments on the softened surface of the film. This embossed surface is then cooled to fix the structure of the embossments. It is said that the time required to heat, emboss, and cool the embossed optical polymer film ranges from about 0.05 to about 1 second, depending in part on the temperature sensitivity of the optical film being embossed.

International patent application PCT/US01/18655 (publication no. WO 01/98066) discloses a process and apparatus for forming thermoplastic products having precise embossed surfaces, using a continuous double band press. This apparatus includes continuous flat beds with two endless bands or belts, preferably of steel, running above and below the product and around pairs of upper and lower drums or rollers. An advantage of such presses is the mainly uniform pressure that can be provided over a large area. This machine forms a pressure or reaction zone between the two belts and has the advantage that pressure is applied to a product when it is flat rather than when it is curved.

The machine is based upon a fluid or air cushion press, which uses a cushion of air to reduce friction between the belt and the rest of the machine. It was conceived by applicants of the above-identified application that this type of press may be suitable for precision embossing of microstructures. The fluid cushion press is sometimes associated with the term "isobaric." In an isobaric press, heat generally does not come from rollers or drums; rather the fluid, i.e. air, provides it. The fluid transfers heat to the steel belts that in turn transfer the heat to the material passing through the press. This provides one advantage over certain prior art forms of embossing equipment—the ability to heat the film to be embossed from both sides.

It will be appreciated from the above discussion that many approaches have been undertaken with regard to embossing of microstructures, and that there is further room for improved microstructure methods and products.

SUMMARY OF THE INVENTION

According to an aspect of the invention, a method of embossing a sheet material includes: heating at least a part of the sheet; pressing a patterned tool against a surface of the at least a part of the sheet, thereby patterning a surface of the sheet; and separating the tool from the surface. The heating includes radiant heating using radiant energy from a radiant energy source. The heating includes passing the radiant energy from the radiant energy source through a relatively radiantly-transparent solid material before absorbing the radiant energy in a relatively radiantly-absorptive solid material. The relatively radiantly-transparent solid material has a lower absorptivity of the radiant energy than does the relatively radiantly-absorptive solid material.

According to another aspect of the invention, a method of embossing a sheet material includes: radiantly heating a relatively radiantly-absorptive portion of the sheet, using radiant energy from a radiant energy source; pressing a patterned tool against a surface of the relatively radiantly-absorptive portion of the sheet, thereby patterning a surface of the sheet; and separating the tool from the surface. The heating includes passing the radiant energy through a relatively radiantly-transparent portion of the sheet before absorbing the radiant energy in the relatively radiantly-absorptive portion of the sheet. The relatively radiantly-transparent portion has a lower absorptivity of the radiant energy than does the relatively radiantly-absorptive portion.

According to yet another aspect of the invention, a method of embossing a sheet material includes: radiantly heating a relatively radiantly-absorptive portion of the sheet, using radiant energy from a radiant energy source; pressing a patterned tool against the relatively radiantly-absorptive portion of the sheet, thereby patterning a surface of the sheet; and separating the tool from the surface. The sheet material is relatively radiantly transparent. The heating includes passing the radiant energy through the sheet before absorbing the radiant energy in the patterned tool. The sheet material has a lower absorptivity than the patterned tool.

According to still another aspect of the invention, a method of embossing a sheet material includes: pressing a patterned tool against the sheet; and, while maintaining the pressing, radiantly heating the sheet, using near-infrared radiant energy from a radiant energy source. The radiantly heating includes passing the radiant energy through a relatively radiantly-transparent material in contact with the sheet.

According to a further aspect of the invention, an embossing system includes a plurality of rollers, arrayed on opposite sides of a passage for receiving therein a sheet material to be embossed; and a radiant heater operatively configured to heat the sheet material while in the passage.

According to a still further aspect of the invention, an embossing system includes a pair of belts arrayed on opposite sides of a passage for receiving therein a sheet material to be embossed; and a radiant heater operatively configured to heat the sheet material while in the passage.

According to another aspect of the invention, an embossing system includes a pair of press platforms configured to press a sheet material therebetween; and a radiant heater configured to deliver radiant energy between the press platforms.

According to still another aspect of the invention, a method of embossing a sheet material includes: radiantly heating the sheet material, using radiant energy from a radiant energy source; and pressing patterned tools against opposite major surfaces of the sheet material.

According to yet another aspect of the invention, an embossing system includes: a plurality of rollers, arrayed on opposite sides of a passage for receiving therein a sheet material to be embossed; a radiant heater operatively configured to heat the sheet material while in the passage; and a patterned belt in the passage, for patterning the sheet material.

According to a further aspect of the invention, an embossing system includes: a pair of belts arrayed on opposite sides of a passage for receiving therein a sheet material to be embossed; and a radiant heater operatively configured to heat the sheet material while in the passage.

According to a still further aspect of the invention, an embossing system includes: a pair of press platforms configured to press a sheet material therebetween; and a radiant heater configured to deliver radiant energy between the press platforms.

According to another aspect of the invention, a method of embossing a sheet material includes the steps of radiantly heating the sheet material, using radiant energy from a radiant energy source; and pressing patterned tools against opposite major surfaces of the sheet material.

According to an aspect of the invention, a method of embossing an optical film includes: providing an optically anisotropic, uniaxially oriented film; heating a patterned tool using radiant energy from a radiant energy source, wherein the pattern comprises a plurality of parallel raised microstructures having a longitudinal direction; pressing the tool against the a surface of the oriented film such that the longitudinal direction of the raised microstructures is substantially parallel to the direction of orientation of the polymer substrate, thereby patterning a surface of the oriented film. In one aspect of the invention, v-shaped grooves are embossed into the surface of the oriented film.

In one form of the invention, the optical film comprises a transparent embossed polymeric film having a plurality of v-shaped microchannels therein. The term "transparent" as used throughout the specification and claims means optically transparent or optically translucent. The embossed film is a uniaxially oriented film wherein the direction of orientation is substantially parallel to the longitudinal direction of the v-shaped microchannels, and wherein the orientation of the embossed polymer film is unchanged throughout the polymer substrate and first major surface.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale.

DETAILED DESCRIPTION

A method of embossing a sheet material includes: heating at least a portion of the sheet directly or indirectly with radiant energy from a radiant energy source; pressing a tool against the heated portion of the sheet, thereby patterning a surface of the sheet; and separating the sheet and the tool. The radiant energy may travel through a solid material that is relatively transparent to radiation, on its way to being absorbed by a relatively-absorptive material. The relatively-transparent material may be an unheated portion of the sheet, and the relatively-absorptive material may be either the tool or the heated portion of the sheet. Alternatively, the relatively-transparent material may be the tool, and the relatively-absorptive material may be all or part of the sheet. The method may be performed as one or more roll-to-roll operations. Alternatively or in addition, the method may include one or more batch processes.

In the following description, first a general outline of embossing methods is given. Then examples are given of several apparatuses suitable for carrying out various embodiments of the method.

Figure 1:
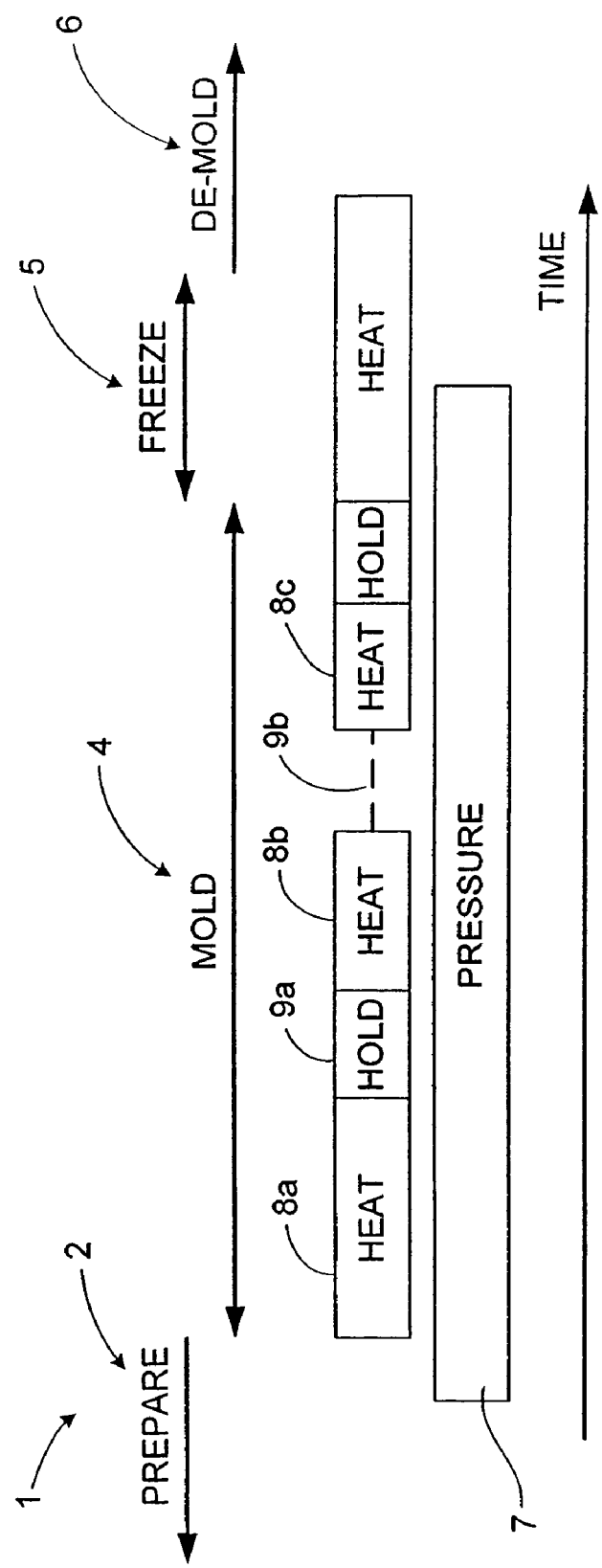
FIG. 1 is a timeline schematically illustrating an embossing method in accordance with the present invention.

The time chart of FIG. 1 shows the chronological sequence of heat application, pressure application and other processing stages within a cycle of a method 1 for molding or embossing precision microstructures. (The terms "molding" and "embossing" are intended here to identify the same process for forming molten sheeting under heat and pressure.) During an initial preparation stage 2, a preformed polymeric film or sheeting to be molded or embossed may be prepared, e.g., by cleaning. The sheeting or film is then delivered (e.g., as a solid web or sheet) to the molding zone where molding occurs in a molding stage 4, under conditions of elevated temperature and elevated pressure. A freezing stage 5 to set the molded pattern follows molding stage 4. Then the sheeting is removed from the molding/embossing apparatus in a de-molding stage 6. Typically, during part or all of the molding stage 4, including the possibility of multiple intervals within that stage (e.g. with multiple pressure nips), the sheeting is subjected to high pressure. In the schematic of FIG. 1, continuous application of pressure is shown at 7. Likewise, during part or all of the molding stage 4, including the possibility of multiple intervals within that stage, the sheeting is subjected to high temperature (e.g. above the glass transition temperature or melting temperature of a thermoplastic material of the sheeting). In the schematic of FIG. 1, three heating intervals 8a, 8b, and 8c are shown with intermediate "hold" (no heating or cooling) intervals 9a and 9b. The chronological relationships of sub-processes may be different from that illustrated in FIG. 1; for example, heating may commence before or after application of pressure. During and/or after the high pressure and heating conditions are terminated, the sheeting is subjected to cooling in order to effect the freezing stage 5.

"Radiant energy" is broadly defined as radiation of whatever wavelength, which transfers heat or energy by photons, as opposed to by the mechanisms of other heat transfer modes such as convection or conduction. The term "radiant energy source" is used herein to denote a generator or other source of radiant energy, while the terms "radiant heater" and "radiant heating system" are used to denote radiant energy sources as well as other associated components, such as reflectors.

The methods and systems described herein use radiant energy as the sole or primary heat source in carrying out a heat plus pressure embossing process of the type schematically illustrated in FIG. 1; such a process can be used for example to emboss precision microstructures that are difficult or impossible to mold or emboss using more conventional processing techniques. Optionally the sheeting also may be subjected to pre-heating prior to the molding stage 4, i.e. during preparation, and this pre-heating may be effected using any suitable process not necessarily involving radiant energy.

The use of thermal radiation as the sole or primary heat source in the embossing process described herein may offer one or more various significant advantages:

(a) Radiant energy heat transfer, in comparison to conductive and convective heat transfer, is capable of achieving significantly higher heat fluxes and embossing temperatures. This opens up a broad range of process capabilities, for example in the embossing of very high $T_g$ thermoplastic polymers.

(b) Radiant energy heating offers various means precisely to control heat transfer to materials to be embossed, and other elements of the system, that cannot be achieved through conductive and convective heating. This includes for example control of the thermal radiation source e.g. via reflection, focusing, filtering, etc. to regulate the spectral and geometric distribution of the radiation. Another example of controlled radiant heat transfer is designing the material or sheeting construction to be embossed, e.g. through doping or multilayer structures, to regulate absorption of the thermal radiation. Controlled radiant heating can achieve various process improvements, such as reduction of the cooling requirements of the system, and improved embossing precision via coordination between localized heat and pressure during embossing.

(c) Radiant energy heating can be combined with other modes of heat transfer, for example conductive heating, to achieve advantageous effects. These effects can be achieved using only a radiant heat source, since the thermal radiation heat transfer can heat structures of the embossing system (particularly the embossing tooling) which in turn may transfer heat to the material to be embossed via conduction.

(d) Radiant energy can provide extremely rapid heating because of the high speed of light.

(e) Radiant energy heating can be incorporated in continuous and non-continuous embossing systems, with effective interaction of key subsystems including radiant heat source optics, embossing tooling, pressurizing structures, and mechanisms for handling webstock or sheetstock to be embossed.

In addition, numerical simulations indicate significant and qualitative differences between radiation and other heating methods, e.g. purely conductive heating. The surface temperature of the sheet material (film) rises sharply in the conductive process versus the smooth rise in for NIR or other radiative heating. In the conductive process as the hot tool comes in contact with the film, it raises the film surface temperature quickly. This causes a large temperature gradient in the film; therefore, heat propagates quickly into the thin film. As the temperature of the film rises and temperature difference decreases, heat transfer slows. By contrast, in the NIR or other radiative process, heat is continually generated on the tool surface, so the temperature of the tool surface rises as a function of time. Because of the thermal resistance of the sheet material, the top (away from the tool) temperature of the sheet material lags that of the bottom (next to the tool). This temperature difference increases because more heat is generated on the surface of the tool that can be conducted away from it. As the tool is made thinner, the temperature profile for conductive tool heating does not change very much. The initial rise of the film surface temperature becomes steeper for thinner tools because the heat resistance of the tool is less. The effect of tool thickness is much more pronounced in the case of radiative heating. The thinner the tool is, the higher the maximum temperature of the film. As the tool is made thinner and the surface temperature rises, the higher temperature difference leads to larger conduction of the heat away from the tool. Thus temperature will tend to increase faster initially and more slowly later. In summary, radiant heating more readily adapts heat output to the requirements of a given system, than does conductive heating. Higher temperatures are made possible just by increasing the duration of radiant heating. Also, it is possible to change temperature by changing the thickness of the tool, i.e. its thermal mass. Use of a thinner tool results in higher temperatures, because the same flux is applied to less tool material.

The foregoing advantages derive from the physical characteristics of radiant energy (thermal radiation). Whereas the transfer of heat energy by conduction and convection depends on temperature differences of locations approximately to the first power, the transfer of energy by thermal radiation depends on differences of individual absolute temperatures of bodies each raised to a power of 4. Because of this characteristic, thermal radiation effects are intensified at high absolute temperature levels.

Figure 1A:
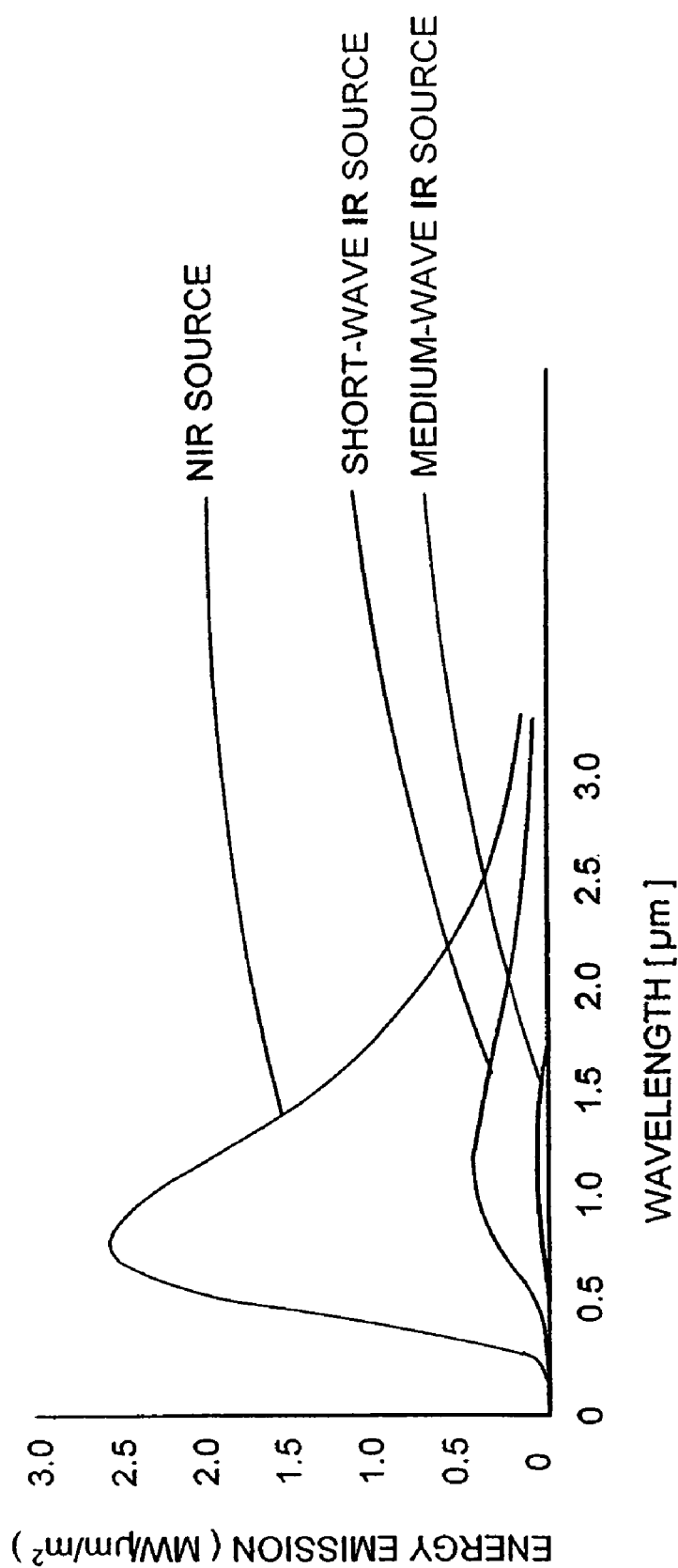
FIG. 1A is a chart showing energy emission characteristics of a blackbody emitter.
Figure 1B:
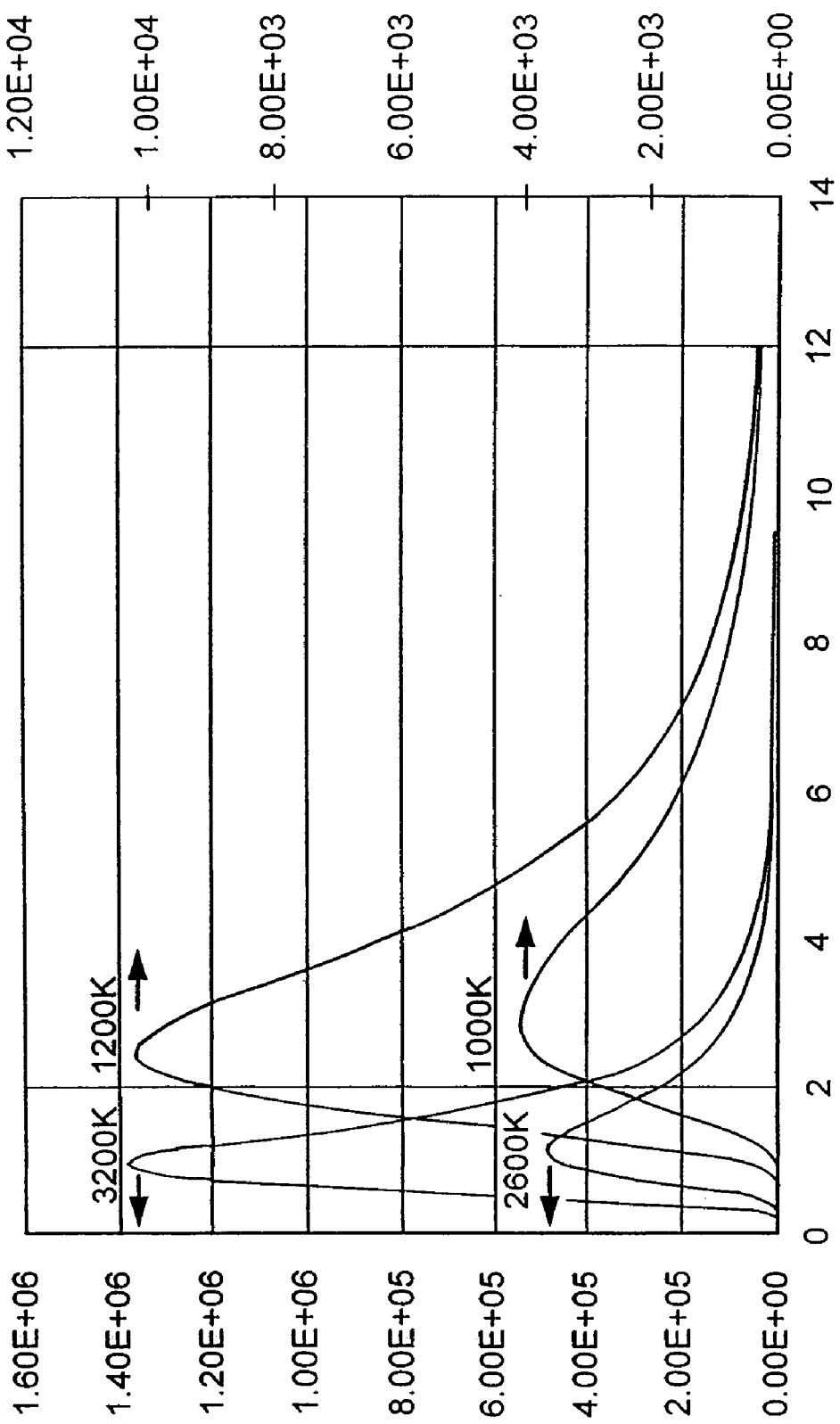
FIG. 1B is a chart showing energy emissions characteristics for various blackbody emitters.

In a preferred embodiment, the radiant energy source is a blackbody emitter that has an energy emission characteristic of the type shown in FIG. 1A. Particularly preferred is high energy near infrared radiant (NIR) heating systems. The preferred radiant heating systems use near-infrared radiation operating at or above 2000K, preferably at or above 3000K. The energy outputs of these emitters are several orders-of-magnitude larger than those of short-wave and medium-wave infrared emitters, and provide high heat fluxes that can be critical for effective heat-plus-pressure precision embossing. Besides the peak wavelength of the output, the emitter operating temperature affects the total energy output; increasing the emitter temperature shifts the peak to a shorter wavelength as well as provides a higher energy output. Various blackbody emissions illustrating these variables are shown in FIG. 1B.

A preferred line of commercially available high-energy NIR systems is supplied by AdPhos AG, Bruckmühl-Heufeld, Germany (AdPhos). AdPhos infrared heating systems provide durable, high energy heating systems; and an AdPhos lamp acts as a blackbody emitter operating at about 3200K. Other radiant heaters and emitters that provide suitable thermal energy are available from various major lamp manufacturers (including Phillips, Ushio, General Electric, Sylvania, and Glenro). For example, these manufacturers produce emitters for epitaxial reactors used by the semiconductor industry. All of these emitters have temperatures over 3000 K. More broadly, however, suitable NIR sources may be emitters with temperatures over about 2000 K. An advantage of the AdPhos system is that whereas most such high energy NIR lamps have a rated life of less than 2000 hours, the AdPhos NIR systems are designed for 4000 to 5000 hours of service life. The radiant energy emissions of the AdPhos lamps have most of their energy in a wavelength range of between 0.4 to 2 microns, which is shifted to a lower wavelength than short-wave and medium-wave infrared sources, providing a higher energy output and other advantages in absorption of the thermal radiation as explained below. Advances in emitter design, in terms of power spectrum, energy output, and durability for industrial applications, have been realized in the past decade.

Blackbody radiation heat sources offer total emissive powers that have a power-of-4 relationship with the peak temperature. Another significant characteristic is the spectral distribution of the radiation. As illustrated below, the spectral distribution of emissive power bears an important relationship to the spectral distribution of absorption characteristics of the material to be embossed, as well as the absorption characteristics of other parts of the embossing system that are subjected to the emitted radiant energy.

The output of a radiant energy source can be controlled in various ways to improve system performance. Most notably, through the use of reflectors (such as curved reflectors (parabolic or elliptic) at the rear of the lamp, and side reflectors), the useful radiant energy output can be significantly increased. Where it is desired to focus the thermal radiation to a very limited geometric area, this can be achieved through focusing optics and reflectors. Another technique is selectively to mask the radiant energy. It is also possible to change the spectral distribution of the emitted energy through filtering.

As another alternative, radiant heating may be used to heat rollers just prior to nipping of the sheet of film by the rollers.

The spectral and spatial distribution of the thermal energy emission from the radiant source can be significantly altered between the source and a point in the system at which absorption of energy and other effects are being considered. The emitted thermal energy can be attenuated for example by absorption intermediate the source and the point under consideration; by scattering; and by other effects. Notwithstanding this attenuation of thermal energy, the very high heat fluxes characteristic of the radiant heat sources that are used here result in high heat fluxes incident on other structures of the embossing system.

Figure 1C:
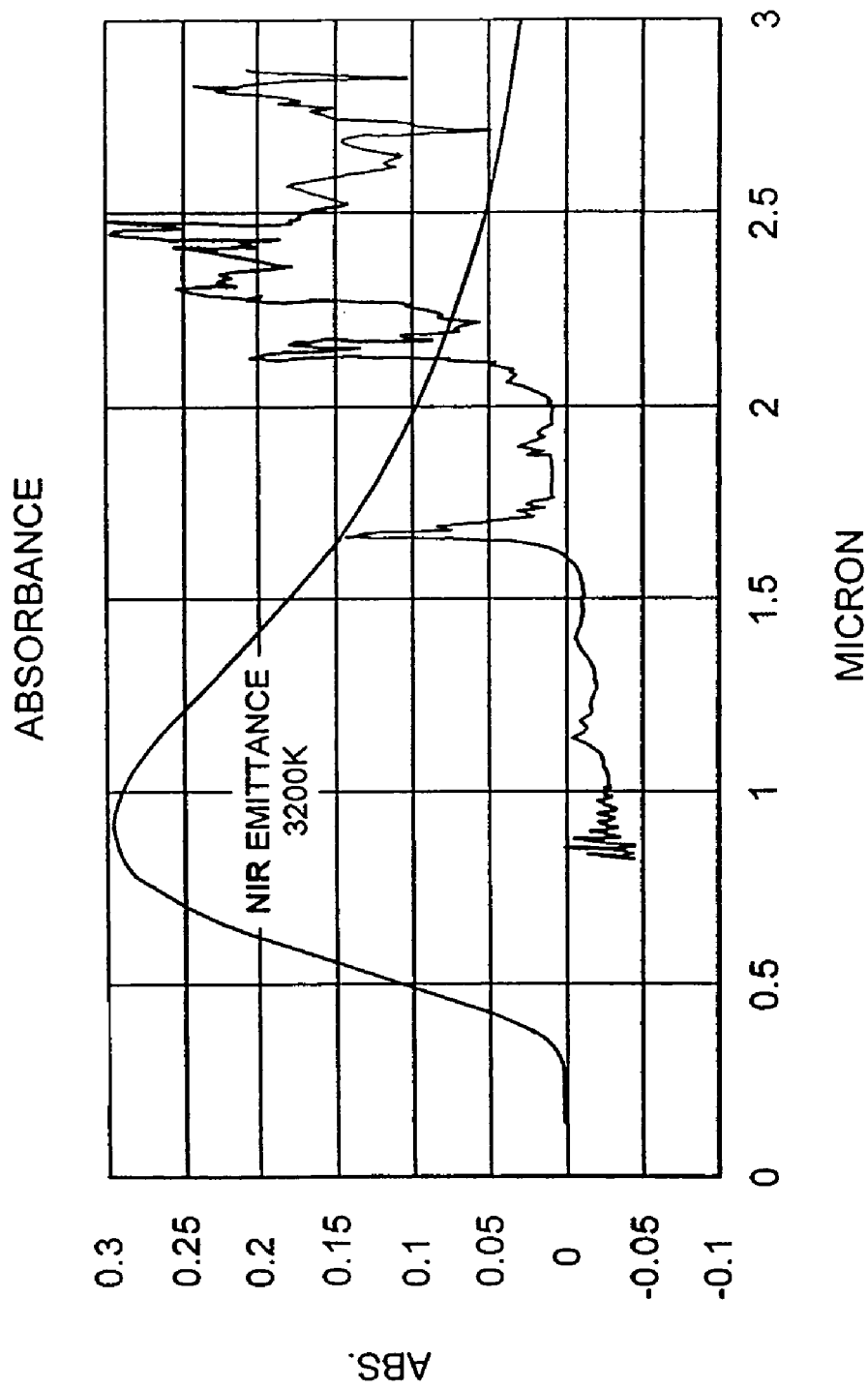
FIG. 1C is a chart showing the spectral absorption of an exemplary sheeting material for use in the present invention.
Figure 1D:
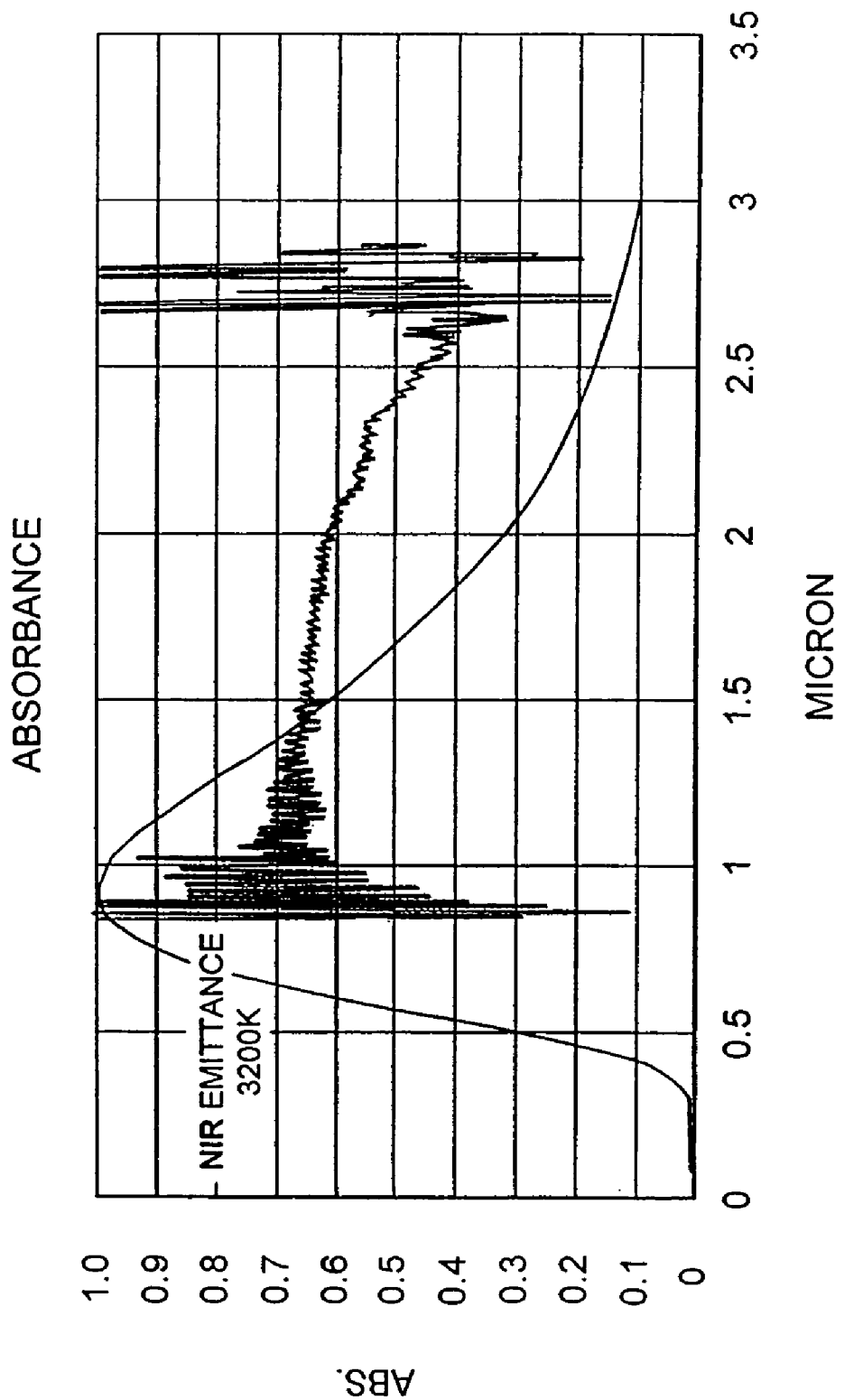
FIG. 1D is a chart showing the spectral absorption of an exemplary tooling material over the same range of wavelengths shown in FIG. 1D.

An important determinant of the radiant heat transfer achieved by the embossing system described herein is the absorptivities of the sheeting or other material to be embossed and of other materials or objects of the system. In this regard, two pertinent properties are the spectral absorptivities of these materials, and their ratio of energy absorbed. Spectral absorptions are illustrated in FIGS. 1C and 1D, which may be considered in conjunction with FIG. 1A. FIG. 1A shows the spectral distribution of the thermal radiation that is incident on the sheeting and/or on the tooling (to simplify the illustration this is shown as a blackbody radiation source, and attenuation of the thermal radiation is ignored), over a range of wavelengths. FIG. 1C shows the relative spectral absorption of an exemplary sheeting material, Ardel sheeting (Ardel is a trademark of Amoco Polymers for a polyarylate polymer), over the relevant range of wavelengths, and FIG. 1D shows the relative spectral absorption of an exemplary tooling material (electroformed nickel tooling) over the same range of wavelengths (these are qualitative values for the sake of this example). The overall absorptivity over the range of wavelengths, which in this patent application is called "ratio of energy absorbed", is the ratio of all absorbed radiant energy (e.g., from the radiant source), to the total incident radiant energy from that direction. The total absorbed energy depends on distribution of the spectral absorptivity in relation to the spectral emissivity across the relevant range of wavelengths. Thus, in the case of the sheeting material, which has relatively low spectral absorptivities at the high-energy wavelengths of the blackbody source, the ratio of energy absorbed will be relatively low, whereas for tooling material, which has relatively high spectral absorptivities at the high-energy wavelengths of the blackbody source, the ratio of energy absorbed will be relatively high.

In considering the total radiant energy absorbed by the sheeting to be embossed, it is necessary to consider not only energy incident from the radiant source, but also reflected thermal radiation that may return to the sheeting. Thus, for example reflections between reflectors that are arranged around the sheeting can cause an "infinite series" of thermal radiation to be absorbed by the sheeting that, despite a relatively high transparency of the sheeting material, can cause significant radiant heating of the sheeting.

As described in greater detail below, the radiant energy may pass through a relatively-radiantly-transparent material before impinging upon and being absorbed by a relatively-radiantly-absorptive material. As used herein, a relatively-radiantly-transparent material (also referred to a "relatively-transparent material" or a "transparent material") is defined as a solid material that is less absorptive to the radiant energy than the relatively-radiantly-absorptive material (also referred to as a "relatively-absorptive material" or an "absorptive material"). Specifically excluded from the definition of relatively-radiantly-transparent material are gasses, such as air, through which the radiant energy may pass on its way from the radiant energy source to the absorptive material. It will also be understood that the term relatively-transparent material, as used herein, does not include materials that are part of the radiant heater or radiant energy source.

The above definitions involve two connections. First of all, it will be appreciated that the above definition of materials as "relatively transparent" or "relatively absorptive" is relative. That is, a material is transparent or absorptive only relative to another material in the case at hand. Furthermore, a material may be relatively transparent in one device or system, and relatively absorptive in another. The concept of relativity that is employed in this definition is that involving specific absorptive properties of a material, its absorptivity per unit volume or per unit mass.

Second, the definition is tied to the spectral emissivity distribution of radiant energy employed. It is possible that a material may be relatively absorptive with regard to another material with respect to a first source of radiant energy, and be relatively transparent with regard to the same material with respect to second radiant energy of a different spectral emissivity distribution. For example, FIGS. 1B and 1C show that Ardel is relatively transparent to a 3200 K source but not to a 1200 K source.

A further note regarding the above terms is that it will be appreciated that even a relatively transparent material may have some level of absorptivity of the radiant energy. Thus, while the radiant energy may be described here as passing through the transparent material and as heating only the absorptive material, it will be appreciated that some absorption in and heating of the transparent material may in fact occur.

Relatively transparent and absorbent materials have been defined above broadly in terms of which is more absorbent of the radiant energy (i.e. greater ratio of energy absorbed from the radiant energy source). However, it will be appreciated that the materials of varying absorptivity may be characterized more narrowly based on a relative ratio of their absorptivity. For example, the relatively-absorptive material may have an absorptivity that is seven times that of the relatively-transparent material.

The relatively-transparent and the relatively-absorptive materials are characterized by comparing their total rate of energy absorption (total energy absorbed per time). The total energy absorption of a material depends on the emission spectrum (wavelengths) of the radiant energy source, the absorptivity spectrum of the material, and the distance that the radiant energy travels through the material. Therefore, the ratio of energy absorbed of a material can be defined as an integral over the volume (or distance) and over the emission spectrum (wavelengths) of the radiant energy, of the product of the intensity spectrum of the radiant energy (a function of wavelength) and the absorptivity spectrum of the material, and an exponential decay function (a function of absorptivity spectrum and distance. The ratio of energy absorbed of the relatively-transparent material to the ratio of energy absorbed of the relatively-absorptive material may be less than 1, may be less than or equal to 0.7, may be less than or equal to 0.5, may be less than or equal to 0.3, may be less than or equal to 0.1, or may be nearly zero.

Having the radiant energy pass through the transparent material to get to the absorptive material allows the radiant energy to be preferentially absorbed in the vicinity of the part of the sheet that is actually embossed. Thus only small portions of the sheet and the tool need actually be heated to accomplish the patterning on the sheet. It will be appreciated that many advantages flow from being able to concentrate the radiant energy where heating is most needed. First, overall energy consumption for the process may be reduced. Second, localized heating may reduce processing time, since times required for heating and cooling of the sheet may be reduced. Further, material properties of the resulting embossed sheet may be improved. Excessive heating, either in terms of excessively elevated temperature or the amount of time maintained at an elevated temperature, may have a deleterious effect on material properties. One example is that prolonged heating may alter orientated structures in a material. By providing localized heating for only a short period of time, this degradation of material properties may be avoided. Excessive heating may result in exceeding the glass transition temperature, flow temperature, and/or melting temperature of the material for a time longer than is necessary to achieve the embossing. Similarly, excessive heating may result in exceeding the glass transition temperature, flow temperature, and/or melting temperature of the material in parts of the material where such heating is not necessary to achieve the embossing. These possible deleterious effects of excessive heating may be reduced or avoided by using the systems and/or methods disclosed herein.

Figure 2:
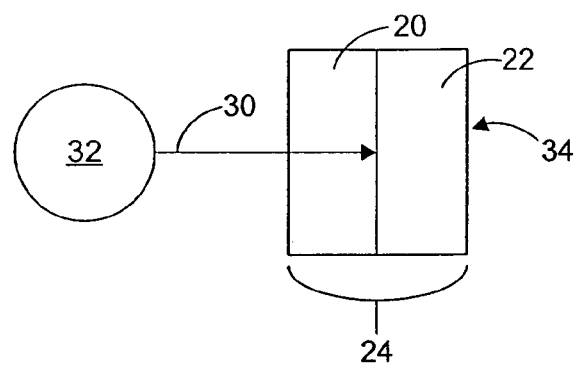
FIG. 2 is a schematic diagram illustrating radiant heating according to one embodiment of the present invention.

As discussed further in the examples below, there are many possible configurations for the transparent material and the absorptive material. As one example, illustrated in FIG. 2, the transparent material 20 and the absorptive material 22 may be different layers of the sheet of material 24 to be embossed. Radiant energy 30 from a radiant energy source 32 passing through the transparent material layer 20 is absorbed by the absorptive material layer 22. Such a configuration may allow localized heating of the portion 34 of the sheet material 24 actually to be embossed. It will be appreciated that sheet material with layers of various absorptivity may be formed in a variety of ways, for example by use of different materials joined together by co-extrusion. Alternatively, the difference in absorptivity may be accomplished by other means, such as by doping with suitable material, such as NIR-absorbing additives or nano-silicates. The localized heating may involve passing radiation back and forth through the material multiple times, with the radiation selectively absorbed in the absorptive material layer. This use of multiple passes of radiation to accomplish the heating may advantageously result in even heating, with small thermal gradients.

Figure 3:
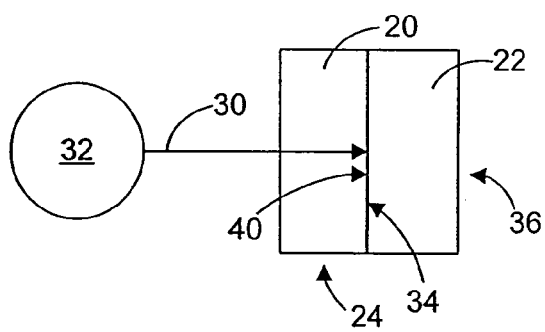
FIG. 3 is a schematic diagram illustrating radiant heating according to another embodiment of the present invention.

Another possible configuration, illustrated in FIG. 3, has the radiant energy 30 pass through the transparent material 20 of the sheet material 24 on its way to being absorbed by a relatively-absorptive material tool 36. Heating may be thus localized at the tool surface 40, and at the portion 34 of the sheet material 24 in contact with the tool surface 40. This is an example of indirect heating of the material to be embossed, in that the radiant energy 30 does not directly heat the material embossed, but only through the intermediary of the heated tool 36.

Figure 4:
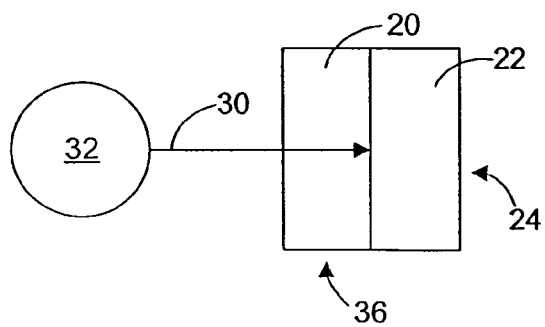
FIG. 4 is a schematic diagram illustrating radiant heating according to yet another embodiment of the present invention.
Figure 5:
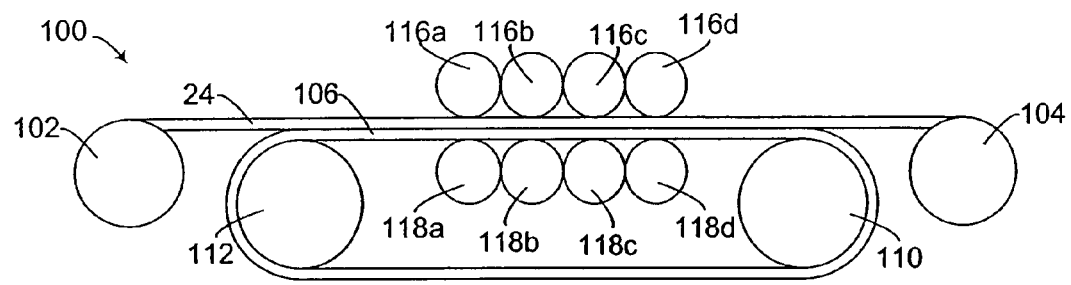
FIG. 5 is a side view of an embossing system in accordance with the present invention.

Yet another possible configuration, illustrated in FIG. 4, has a tool 36 made of a transparent material 20 and the sheet material 24 made of the absorptive material 22. Radiant energy from the radiant energy source passes through the transparent tool and is absorbed by the sheet material 24 to be embossed.

It will be appreciated that the transparent material 20 may include two or more materials between the radiant energy source 32 and the absorptive material 22. For example, the system may be configured such that the radiant energy 30 passes between transparent material of both a tool and a portion of the sheet material 24, before being absorbed by another portion of the sheet material 24.

The heating may be sufficient to melt at least a portion of the sheet material 24. Alternatively, the heating may only soften the heated portion of the sheet material 24, for example by raising the temperature of the heated portion above the glass transition temperature for the material. In either case, the heating makes the portion of the sheet more susceptible to formation of recesses and/or protrusions along a surface of the heated portion of the sheet.

Specific examples of relatively radiantly transparent and relatively radiantly absorptive materials are discussed below, all in relation to the emission spectrum of the AdPhos NIR emitters, which have most energy output in the range from 0.7 to 1.5 microns and a peak output at about 0.8 microns:

Quartz and Pyrex® (borosilicate glass) are nearly transparent to the emitted energy, since these materials do not absorb very much below about 2 microns. These materials have been employed in hard rollers and other structures that can press against the sheeting to be embossed (pressure source for embossing process). These pressure structures permit the thermal radiation to be transmitted through to the heating highly efficiently (cf. FIG. 1C).

Various thermoplastic polymeric sheeting or films can be used as the material to be embossed, as discussed below. These polymeric materials also are nearly transparent to the emitted energy, since these polymers do not absorb very much below about 2 microns. In addition to films to be embossed, as well known in the art of precision embossing, one may combine such a film or sheeting with a carrier film, e.g. Mylar®, which likewise is highly transparent to the radiant energy. Thus the radiant energy can be transmitted through the film to the tooling with limited losses.

Nickel and nickel alloys, which are preferred materials used in electroformed tooling for precision embossing, are highly absorptive of the NIR radiation. The incident NIR radiation rapidly heats the tooling to temperatures that can be well above the 500° F. upper limit achieved by conventional circulatory oil heating of embossing tooling. This results in improved conductive heating of the sheeting to be embossed, which contributes to desirable fluidity of the thermoplastic material at the sheeting surface for the purpose of molding and freezing well formed, defect-free precision microstructures.

These preferred structures may be combined in an embossing system in which nickel tooling absorbs most of the emitted thermal radiation to provide fast and efficient embossing. The film to be embossed can be radiated when pressed against the tool using a transparent pressure structure intermediate between the film and the radiant emitter. The radiation passes rapidly through the film and is absorbed at the surface of the embossing tooling. This rapidly heats the tool, which in turn melts the film locally and embosses the film. It should be emphasized that this functionality is not necessarily dependent on the use of AdPhos NIR emitters as the radiant energy source, but could be achieved using other emitters if the total heat fluxes (radiant energy emission) and the emission spectra are similar.

In the mold stage 4 of the method 1 (FIG. 1), the sheet material 24 (FIGS. 2-4) is patterned by pressing the tool 36 (FIGS. 2-4) against the heated portion of the sheet. The tool 36 may have a patterned surface, with recesses and/or protrusions. By pressing the tool against the heated portion, the portion of the sheet is patterned with a corresponding array of protrusions and/or recesses.

The pressing of the tool 36 against the sheet material 24 may be accomplished by pressing the two together as part of a roll-to-roll process. For example, a flexible patterned belt may be used as a tool to impart a pattern of protrusions and/or recesses on the sheet. Indeed, all of the steps of the method 1 may be performed as part of a single roll-to-roll process.

The pressing of the tool against the sheet material 24 may be commenced before the heating of the heated portion of the sheet material 24, such that the tool 36 is first pressed against the sheet material 24, and then the portion of the sheet material 24 is heated. The heating of the portion while the tool 36 is pressed against the sheet material 24 may be by conduction from the tool to the sheet material 24, or may be direct heating by the radiant energy.

Further, there may be continuous constraint of the sheet material 24 while it is heated. The sheet material 24 may be constrained, such as being between belts, during the heating and embossing, until the embossed sheet material is cooled, for example being cooled below the glass transition temperature or flow temperature of the material.

Alternatively, the pressing may occur only after the heating has been completed.

In the de-mold stage 6 of the method 1 (FIG. 1), the sheet material 24 and the tool 36 are separated. The separation occurs after the mold stage 4, and may be delayed to allow sufficient cooling of the patterned heated portion of the sheet material 24, so that the patterned sheet material maintains its shape after separation. To that end, there may be a separate step of cooling the sheet material 24 and/or the tool 36, such as the freeze stage 5 of the method 1 (FIG. 1).

It will be appreciated that the cooling cycle may be speeded up and may use less energy, compared to prior systems using other heating mechanisms. This is because heating may be more localized, involving less heating of the sheet material 24 and less heating of the tooling adjacent to the sheet material 24. In conventional embossing systems, using electrical or oil heating, a large mass of the machine, e.g., a heating drum, is heated and pressed against material to be embossed. This large mass of heated machine makes cooling of the embossed material more difficult, causing additional time and/or energy to be expended to accomplish the desired cooling. In order to practically effect the cooling in such systems, separation of the embossed material from the heated machinery may be required, which may adversely affect the quality of the embossed product.

The embossing (or molding) methods described herein may be used for embossing microstructures in any of a wide variety of materials, to thereby form a precision microstructured material. As used in the present application, "precision microstructured material" or "precision microstructured film" generally refers to a thin film or sheet of resinous thermoplastic material having an embossed precise geometric pattern of very small elements or shapes, and in which the precision of the formation is important to the functionality of the product. The precision of the embossed film is a function of both the precise geometry required of the product, and the capability of the embossing tool, process and apparatus to conserve the geometric integrity from tool to article.

Typically at least one or more of the following features will be formed in the film, (on one or both sides thereof):

(a) flat surfaces with angular slopes controlled to a tolerance of 5 minutes relative to a reference value, more preferably a tolerance of 2 minutes relative to a reference value; or to at least 99.9% of the specified value;

(b) having precisely formed (often, very smooth) surfaces with a roughness of less than 100 Angstroms rms relative to a reference surface, more preferably with a roughness configuration closely matching that of less than 50 Angstroms rms relative to a reference surface; or, if the surface requires small irregularities it may be greater than 100 Angstroms and less than 0.00004 inch (1 micron);

(c) having angular acute features with an edge radius and/or corner radius of curvature of less than 0.001 inches (25 microns) and controlled to less than 0.1% of deviation;

(d) having an embossing depth less than 0.040 inches (1000 microns), more preferably less than 0.010 inch (250 microns);

(e) precisely controlled dimensions within the plane of the sheeting, in terms of the configuration of individual elements, and/or the location of multiple elements relative to each other or a reference point; and (f) characteristic length scale (depth, width, and height) less than 0.040 inch (one millimeter with an accuracy that is better than 0.1 percent.

In certain embodiments of precision microstructured film, discrete elements and/or arrays of elements may be defined as embossed recessed regions, or embossed raised regions, or combinations of embossed recessed and raised regions, relative to the unembossed regions of the film. In other embodiments, all or portions of the precision microstructured film may be continuously embossed with patterns of varying depths comprising elements with the characteristics described above. Typically, the discrete elements or arrays of elements are arranged in a repetitive pattern; but it will be appreciated that other, non-repetitive arrays of precision microstructured shapes may also be embossed.

Exemplary types of precision microstructured sheeting, and their requirements of precision, are stated below in several examples.

For retroreflective materials for road reflectors or signage, and Fresnel lenses, in such optical sheeting applications, precise flatness, angles and uniform detail are important. Cube-corner type reflectors, to retain their functionality of reflecting light back generally to its source, require that the three reflective faces of the cube be maintained flat and within several minutes of 90° relative to each other. Spreads beyond this, or unevenness in the faces, results in significant light spread and a drop in intensity at the location desired. Also, surface smoothness is required so light is not diffused.

Feature to feature accuracy is important for LCD display systems in which adjacent embossed recesses not only have to be precisely shaped, but the spatial relations of the array of recesses must be closely adhered to.

Another feature that may be desirable is the ability to manufacture microstructures with an edge radius of less than 0.001 inches (25 microns) and with very sharp points and sharp ridges (less than 0.00028 inches (7 microns).

Yet another desirable attribute may be volumetric accuracy for microfluidic and microwell applications with 90% or greater accuracy of the cross sectional area being conserved through the length of channel; and from channel to channel, and/or well to well, in which dimensions range from 0.00020 to 0.008 inches (5-200 microns) depth; 0.00020 inches to 10 inches (5 microns to 25.4 cm) length. The channels may have convoluted shapes and microtextured shapes.

It also may be desirable to achieve surface roughness for microfluidic applications that allow for low friction and minimal surface drag, all resulting in smooth continuous non-diffusive flow, allowing the laminar fluid flow.

The method described above allows avoidance of residual stresses by providing essentially stress free microstructures. This is critical for some optical, FSA, and for microfluidic applications where the detection mechanisms use fluorescent polarization technology. Materials with stress generally have strand orientation, which acts like a polarizing lens. Materials that contain residual stresses may relax that stress during subsequent processing or during the life cycle of the product, resulting in dimensional instability.

The precision microstructured pattern typically is a predetermined geometric pattern that is replicated from the tooling. It is for this reason that the tooling may be produced from electroformed masters that permit the creation of precisely designed structures. In contrast, high tensile stainless steel, which has typically been used in the bands of double band presses, is not well suited to creation of tooling for embossing of such precisely controlled microstructures. Micromachining and photolithography are methods that may be used to create masters. The masters typically are replicated using electroforming to generate multiple tools or can be used directly as embossing tools themselves.

Considering now the sheet film material 24 in greater detail; for purposes of this description, two temperature reference points are used: $T_g$ and $T_e$. $T_g$ is defined as the glass transition temperature, at which plastic material will change from the glassy state to the rubbery state. The material may need to be hotter than $T_g$ before it can flow.

$T_e$ is defined as the embossing or flow temperature where the material flows enough to be permanently deformed by the continuous press or other processes described herein, and will, upon cooling, retain form and shape that matches or has a controlled variation (e.g. with shrinkage) of the embossing tool. Because $T_e$ will vary from material to material and also will depend on the thickness of the film material and the nature of the dynamics of the continuous press, the exact $T_e$ temperature is related to process conditions including the embossing pressure(s); the temperature input of the continuous press and the press speed, as well as the extent of both the heating and cooling sections in the reaction zone.

The embossing temperature must be high enough to exceed the glass transition temperature $T_g$, so that adequate flow of the material can be achieved to provide highly accurate embossing of the film.

Numerous thermoplastic materials may be considered as polymeric materials to provide precision microstructure film. However, not all can be embossed on a continuous basis. Applicants have experience with a variety of thermoplastic materials to be used in continuous embossing under pressure at elevated temperatures. These materials include thermoplastics of a relatively low glass transition temperature (up to 302° F./150° C.), as well as materials of a higher glass transition temperature (above 302° F./150° C.).

Typical lower glass transition temperature (i.e. with glass transition temperatures up to 302° F./150° C.) include materials used for example to emboss cube corner sheeting, such as vinyl, polymethyl methyacrylate, low $T_g$ polycarbonate, polyurethane, and acrylonitrile butadiene styrene (ABS). The glass transition $T_g$ temperatures for such materials are 158° F., 212° F., 302° F., and 140° to 212° F. (70° C., 100° C., 150° C., and 60° to 100° C.).

Higher glass transition temperature thermoplastic materials (i.e. with glass transition temperatures above 302° F./150° C.) that have been found suitable for embossing precision microstructures, are disclosed in a co-pending patent application, U.S. Ser. No. 09/776,281, filed Feb. 2, 2001. These polymers include polysulfone, polyarylate, cyclo-olefinic copolymer, high $T_g$ polycarbonate, and polyether imide.

A table of exemplary thermoplastic materials, and their glass transition temperatures, appears below as Table I:

TABLE I

| Symbol | Polymer Chemical Name | $T_g$ ° C. | $T_g$ ° F. |
| --- | --- | --- | --- |
| PVC | Polyvinyl Chloride | 70 | 158 |
| Phenoxy | Poly (Hydroxyether) | 95 | 203 |
| PMMA | Polymethyl methacrylate | 100 | 212 |
| BPA-PC | Bisphenol-A Polycarbonate | 150 | 302 |
| COC | Cyclo-olefinic copolymer | 163 | 325 |
| PSF | Polysulfone | 190 | 374 |
| Polyarylate | Polyarylate | 210 | 410 |
| Hi-$T_g$-PC | High $T_g$ polycarbonate | 260 | 500 |
| PEI | Polyether imide | 215 | 500 |
| Polyurethane | Polyurethane | varies | varies |
| ABS | Acrylonitrile Butadiene Styrene | 60–100 | 140–212 |

The thermoplastic sheeting also may comprise a filled polymeric material, or composite, such as a microfiber filled polymer, and may comprise a multilayer material, such as a coextrudate of PMMA and BPA-PC.

A variety of thermoplastic materials such as those listed above in Table I may be used for the formation of microstructures using the systems and methods described elsewhere in this description. Relatively low $T_g$ thermoplastic materials such as polymethyl methyacrylate, ABS, polyurethane and low $T_g$ polycarbonate may be used. Additionally, relatively high $T_g$ thermoplastic materials such as polysulfone, polyarylate, high $T_g$ polycarbonate, polyetherimide, and copolymers also may be used in an embossing system or press. Applicants have observed as a rule of thumb that for good fluidity of the molten thermoplastic material in the reaction (embossing) zone, the embossing temperature $T_e$ should be at least 50° F. (28° C.), and advantageously between 100° F. to 150° F. (55° C. to 83° C.), above the glass transition temperature of the thermoplastic sheeting.

In addition to the amorphous thermoplastic materials described above, suitable crystalline thermoplastic materials may be utilized. Crystalline thermoplastic materials in general have a low $T_g$ and a high melting point $T_m$, relative to amorphous thermoplastic materials. An example of a suitable crystalline thermoplastic material is Nylon 6, which has a $T_g$ of 50° C. and a $T_m$ of 210° C. In embossing crystalline thermoplastic materials, $T_m$, rather than $T_g$, is the temperature to be exceeded.

With such thermoplastic materials the pressure range is approximately 150 to 700 psi (1.03 to 4.82 MPa), and potentially higher, depending on factors such as the operational range of the machinery; the mechanical strength of the embossing belt or tool (high pressure capacity); and the thermoplastic material and thickness of the thermoplastic film.

Amorphous thermoplastic materials may react to heating differently from crystalline thermoplastic materials. Upon sufficient heating, amorphous thermoplastic materials eventually exceed their glass transition temperature and reach a state in which softening occurs. Further heating may cause the amorphous thermoplastic material to reach a temperature at which flow of the material occurs. Still further heating may cause the amorphous material to reach a temperature at which it decomposes.

In contrast, heated crystalline thermoplastic materials may melt without first undergoing any significant softening at a temperature below the melting temperature. Therefore constraint of the material may be important when embossing crystalline thermoplastic materials.

Thermoplastic materials of thicknesses of up to 0.250 inches (6.35 mm) may be embossed with precise formations in the range of 0.0004 to 0.040 inches (10 to 1000 microns) deep. It will be appreciated that other thicknesses of thermoplastic material, for example thickness greater than that listed above, may alternatively be embossed.

The apparatus and processes described herein allow for the thermoplastic film material to be relatively thick and yet still have precision microstructures in one or both major surfaces. This allows products as diverse as office light diffusers, reflective signage, compact disks, flat panel displays, high-efficiency lighting systems for internally illuminated signs and medical diagnostic products to be efficiently, effectively and inexpensively manufactured. Another exemplary application is retroreflective lenses for road markers, which are more than 0.04 inches (1 mm) thick. The embossing is on the order of 0.008 inches (0.2 mm) deep.

In embossing relatively thick thermoplastic sheeting, it will be appreciated that at least some embodiments disclosed herein may be used to emboss both sides of the sheet material 24 without heating the center. Besides double sided embossing of a monolayer sheet, the embossing processes described herein permit the embossing of two sheets separated by a separator sheet, which are later stripped apart; an example is a sandwich of PMMA, PET, and PMMA films.

As a further variation, the thermoplastic film may be a coextruded, peelable construction such as disclosed in U.S. Pat. No. 4,925,714, wherein after embossing of the faces of the sheeting, and cooling and removal of the sheeting from the continuous press, two embossed films may be separated from each other at a peelable interface. Care must be taken to avoid air entrapment between the layers resulting in a less than perfect optical surface under certain conditions.

Where it is required to register the images embossed on both sides of the thermoplastic sheeting, a suitable mechanical and/or electro-optical subsystem may be provided to ensure the registration of the embossed images, as known in the art of registration printing. In some applications, however, registration of the embossed images would not be required. The use of transparent constructions in radiative heating and embossing lends itself to easy incorporation of optical registration devices.

The use of the phrase "thermoplastic material" in the appended claims is intended to cover all of the foregoing possibilities—single layer film; laminates; use of a strippable carrier; and registered and unregistered embossing.

As noted above, parts of the sheet material 24 may be doped to increase their absorptivity. Many plastics, e.g. polyolefins and polystyrenes, have low absorption of suitable types of radiant energy, such as near-infrared energy. Where the desired effect is heating of the plastic, one does not want the plastic to reflect or transmit all of the near infrared radiation or other type of radiant energy, since there is then no interaction. Nor must excessively strong absorption take place, since in this case the high thermal gradients and high temperatures may lead to decomposition of the plastics. The absorption of the near-infrared or other radiant energy, and therefore the interaction with the material, depends on the chemical structure of the plastic and on the characteristics of the near-infrared radiation used. It may be necessary to add appropriate additives, such as absorbers, in order to render plastics able to absorb a suitable amount of the radiant energy.

Alternatively, one may chemically modify the base polymers in order to render the polymeric material more absorbent of the radiant energy, such as near-infrared energy.

Additives to the sheet material 24 may include suitable dopants. The term dopant is broadly defined herein as relatively absorbent material of the radiant energy, which is in or on the sheet material. Thus a dopant may be actually within the polymer or other material or component of the sheet material 24. Alternatively or in addition, the dopant may be a coating on the sheet material 24. Such dopants may be dispersed through the sheet material 24; may be chemically reacted throughout part or all of the sheet material 24; and/or may be in a separate phase on or within the sheet material 24.

The desirable concentration of the dopant in the plastic may depend on the type of polymer material, and the wavelength and energy of the radiant energy employed, among other factors. A small proportion of dopant may not substantially alter the material properties of the polymer sheet material 24, and hence may have little or no effect on its processability.

Incorporation of a dopant within the thermoplastic can take place by mixing the plastic pellets with the dopant, followed by shaping with exposure to heat. Other conventional mixing techniques, including compound extrusion, would be known to one of ordinary skill in the art. During incorporation of the dopant, the plastic pellets may, if desired, be treated with adhesion promoters, polymer-compatible solvents, stabilizers and/or surfactants resistant to the operating temperatures used. The doped plastic pellets may be produced by placing the plastic pellets in a suitable mixer, wetting these with any additives, and then adding and incorporating the dopant. The resultant mixture may then be directly processed in an extruder.

Extruded films may have a homogeneous dopant distribution. On the other hand, a non-uniform distribution of the dopant may be desired in order to localize the radiant heating effect within a certain region of the polymeric substrate. One way this can be achieved is by including dopant within one layer of a multilayer coextrudate. Thus such localization, or non-uniform distribution of the dopant, can be achieved by strata or layers across the thickness dimension of the substrate. Localization of dopant also may be achieved within the plane of the substrate, e.g., by depositing or printing the dopant in a desired pattern, such as a grid. The dopant may comprise particulate matter, and also may comprise a coating. The coating may be a surface coating, or may be an interfacial coating or layer between layers of a multilayer substrate.

As a further alternative, the dopant may be impregnated into the sheet material 24. The sheet material 24 may be impregnated by swelling a surface of the sheet material 24 with a solvent, allowing the dopant to migrate into the swollen structure, and then removing the solvent, causing the swelling to reverse and trapping the dopant within a polymer structure of the sheet material 24. Further details regarding impregnation methods may be found in U.S. Pat. Nos. 4,937,026 and 5,453,100, which are herein incorporated by reference in their entireties.

The dopant may be placed in a pattern on or within the sheet material 24. For example, the dopant may be placed at locations within the sheet material 24 where deformation of the material is to be greatest.

Examples of suitable dopants are Epolight 1125, 1178, and 3063 near-infrared absorbing dyes available from Epolin, Inc., of Newark, N.J.

Turning now to FIGS. 5-7A, a system 100 is shown for performing the method described above, in a roll-to-roll process. The system 100 embosses the sheet material 24 as the sheet material 24 travels from a supply roll 102 to a take-up roll 104. A patterned belt 106 travels around a pair of rollers 110 and 112. Press rollers 116a-116d and 118a-118d press the sheet material 24 and the patterned belt 106 together. The sheet material 24 is heated during this pressing, such that the pattern from the patterned belt 106 is transferred to the sheet material 24.

Figure 6:
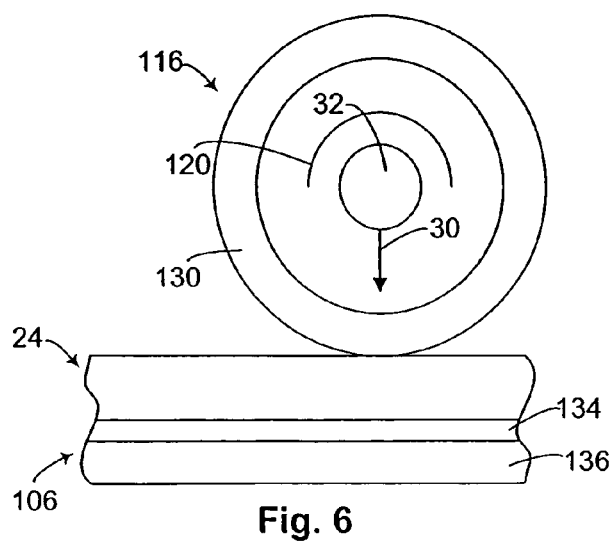
FIG. 6 is a detailed side view of parts of one embodiment of the embossing system of FIG. 5.
Figure 7:
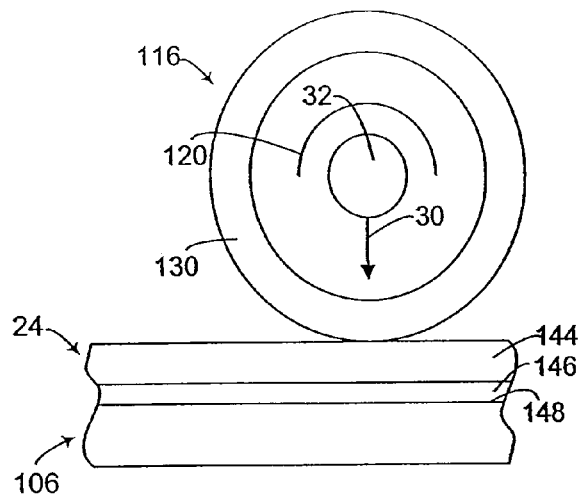
FIG. 7 is a detailed side view of parts of another embodiment of the embossing system of FIG. 5.

FIGS. 6 and 7 show details of one of the rollers 116. The roller 116, which may be typical of one or more of the rollers 116a-d, includes a radiant energy source 32 that directs radiant energy 30 toward the sheet material 24 and the patterned belt 106. A reflector 120 re-directs at least some of the radiant energy 30, initially emanating from the radiant energy source 32 in a direction away from the sheet material 24 and the patterned belt 106, toward the sheet material 24 and the patterned belt 106. The reflector 120 thereby increases efficiency of the radiant heating. The reflector 120 may also be configured to focus the radiant energy 30 on a narrow area of the sheet material 24, providing concentrated heating.

The roller 116 includes a transparent roller material 130 between the radiant energy source 32 and the sheet material 24. The transparent roller material 130 allows the radiant energy 30 to pass through, while being hard enough to press the sheet material 24 and the patterned belt 106 together to pattern the sheet material 24. The transparent roller material 130 may be quartz, for example. As another alternative, the transparent roller material 130 may be a glass material, such as that sold under the trademark PYREX. More specifically, the roller material may be a glass able to withstand thermal stress. It will be appreciated that other alternatives may be used for the roller material, such as transparent or translucent ceramic materials, and polymer materials sold under the trademark TEFLON.

In one embodiment, shown in FIG. 6, the sheet material 24 is a transparent material, which allows most of the radiant energy 30 to pass therethrough. The radiant energy 30 is then absorbed by an absorbent material of the patterned belt 106. The patterned belt 106 may include a tooling surface 134 and a flexible backing 136. The tooling surface 134 may include a material that is both absorbent with respect to the radiant energy 30, and is sufficiently hard so as to transfer its surface pattern to the sheet material 24. The flexible backing 136 may provide cushioning for the pressing together of the sheet material 24 and the patterned belt 106. In addition, the flexible backing 136 may be a thermal insulator, when compared with the material of the tooling surface 134. By using a thermal insulator for the flexible backing 136, the heating from the radiant energy 30 may be concentrated in the tooling surface 134, with little or no appreciable heat loss through the flexible backing 136.

A suitable material for the tooling surface 134 is nickel, and a suitable material for the flexible backing 136 is rubber. However, it will be appreciated that other suitable materials may alternatively be used. Examples of alternative tool materials that may be suitable are nickel alloys, cobalt, chromium, manganese, silicon, and suitable ceramics.

Tooling materials discussed in the preceding paragraph may function as absorptive materials, while the thermoplastic materials shown above in Table I may function as relatively transparent materials. Alternatively, as discussed above, parts of the sheet material may be made relatively absorptive, for example by use of dopants or different sheet materials. The use of relatively-transparent materials advantageously allows more flexibility in configuring the locations of energy sources, rollers, and sheet material.

The configuration shown in FIG. 6, that of a radiant energy source 32 with a transparent roller material 130, may be used in each of the rollers 116a-116d. Alternatively, one or more of the rollers 116a-116d may be simple press rollers without a radiant energy source. It will be appreciated that the radiant heating, such as from the radiant energy source 32, may be combined with other types of heating, such as heating from conventionally-heated rollers, if desired. The possibility for combining different types of heating may be employed as suitable for all of the embossing systems described herein.

In another embodiment, shown in FIG. 7, the sheet material 24 includes a transparent upper layer 144, and an absorbent lower layer 146. The lower layer 146 may include a suitable dopant, such as those described above. The radiant energy 30 passes through the upper layer 144 and is absorbed in the lower 146. This heats the lower layer 146, softening or melting a portion of the sheet material 24 along a lower surface 148 that is in contact with the patterned belt 106.

Figure 7A:
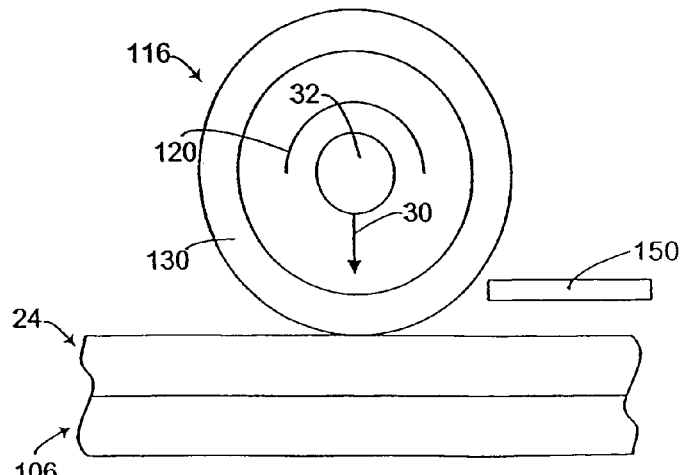
FIG. 7A is a detailed side view of parts of yet another embodiment of the embossing system of FIG. 5.

In yet another embodiment, illustrated in FIG. 7A, the transparent roller material 130 has a patterned outer surface that patterns a top surface of the sheet material 24. The belt 106 may include a reflective material that may be patterned for embossing the bottom surface of the sheet material 24. The patterned belt 106 may include a reflective material, such as polished aluminum or copper, that reflects at least some of the unabsorbed radiant energy back through the sheet material 24. An additional reflector 150 may be utilized to reflect unabsorbed radiant energy further times through the sheet material. This configuration of reflectors (the belt 106 of reflective material and the additional reflector 150) allows multiple chances for the sheet material 24 to absorb the incident radiant energy, which may advantageously improve the efficiency and evenness of the radiant heating of the sheet material 24.

It will be appreciated that other variants on the configurations shown in FIGS. 6-7A may be possible. For example, it may be to have the radiant energy 30 absorbed in both the tool and part of the sheet material 24. Further, the tool may act as a reflector, allowing radiant energy not absorbed in the sheet material 24 during its initial pass through the sheet material 24 to be reflected into the sheet material 24, to perhaps be absorbed in the sheet material 24.

As noted above with regard to the embodiment shown in FIG. 7A, the system 100 (FIG. 5) may be used to pattern both surfaces of the sheet material at the same time, for example by providing a dimpled or otherwise suitable patterned surface on the outer surface of the transparent roller material 130. In patterning both surfaces of the sheet material 24, it may be desirable to suitably dope the sheet material 24 so as to achieve heating at both surfaces of the sheet material 24. For example, it may be desirable to dope sections of the sheet material 24 to allow absorption of the radiant energy 30 at both surfaces. Such doping may involve different concentrations of dopants at the different surfaces.

Figure 8:
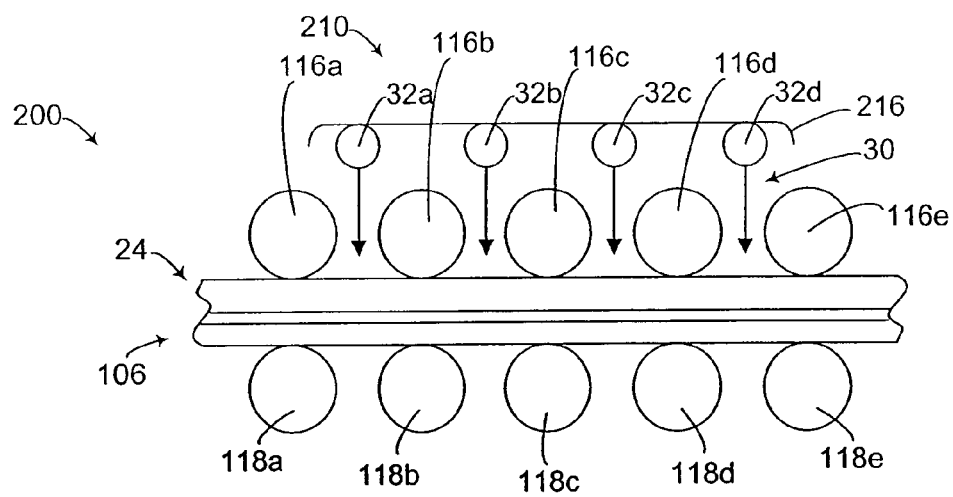
FIG. 8 is a side view of parts of an alternate embodiment embossing system in accordance with the present invention.

Turning now to FIG. 8, a different type of radiant heating system is illustrated. The embossing system 200 shown in FIG. 8 includes a radiant heating system 210 that is separate from the press rollers 116a-116e and 118a-118e. The radiant heating system 210 includes radiant energy sources 32a-32d that transmit radiant energy 30 from the sources 32a-32d to the sheet material 24, between the press rollers 116a-116e. A reflector 216 may aid in directing the radiant energy from the radiant energy sources 32a-32e to the sheet material 24 and/or to the patterned belt 106. It will be appreciated that the radiant energy may pass through part of the sheet material 24, and be absorbed by another part of the sheet material 24, similar to the configuration described above, particularly with regard to FIG. 7. Alternatively, the sheet material 24 may be fully composed of transparent material, with the bulk of the radiant energy 30 absorbed by the tooling surface 134 of the patterned belt 106, similar to the configuration described above with regard to FIG. 6.

Figure 9:
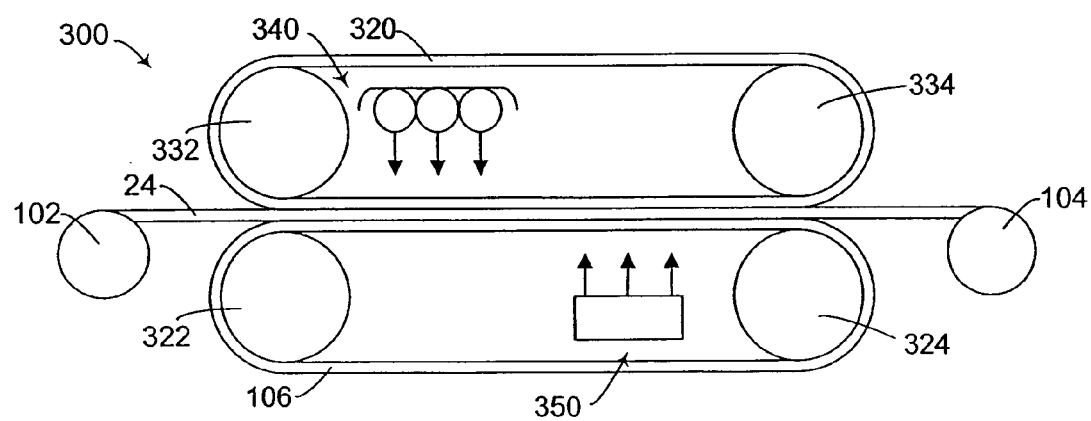
FIG. 9 is a side view of another alternate embodiment embossing system in accordance with the present invention.
Figure 10:
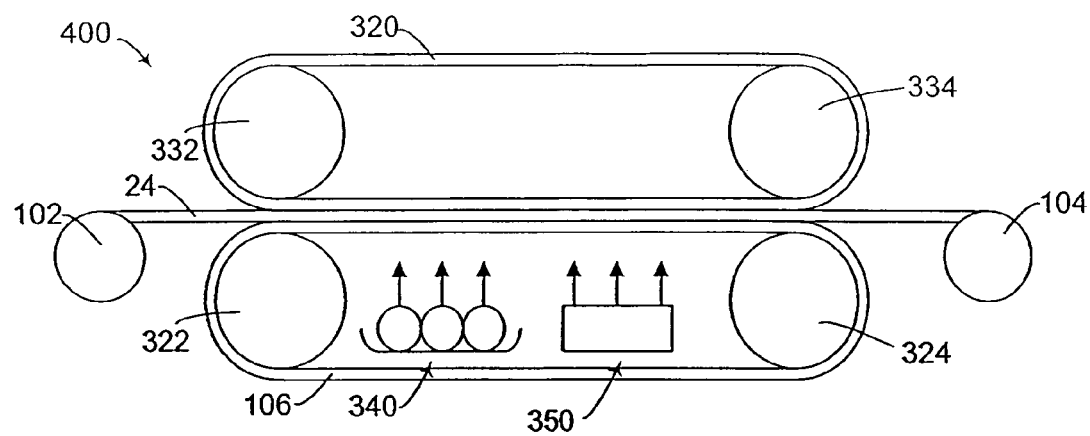
FIG. 10 is a side view of yet another alternate embodiment embossing system in accordance with the present invention.

FIGS. 9 and 10 show further alternative embossing systems. The embossing systems 300 and 400 each involve pressing the sheet material 24 between a patterned belt 106, and an additional belt 320. Pairs of rollers 322, 324 and 332, 334 maintain pressure against the belts 106 and 320, and thereby against the sheet material 24. It will be appreciated that additional rollers and/or fluid (e.g. air) pressure may be used for pressing the belts against the sheet material.

While pressure is maintained against the sheet material 24, a radiant heating system 340 heats the sheet material 24 and/or the belts 106, 320, and a cooling system 350 cools the sheet material 24 and the belts 106, 320. The radiant heating system 340 may be similar to the radiant heating system described above with regard to FIG. 8. That is, the radiant heating system 340 may include one or more radiant energy sources, and a reflector to direct the radiant energy toward the sheet material 24 and/or the belts 106, 320. The cooling system 350 may be any of a variety of known suitable systems for cooling the sheet material 24 suitable for cooling the sheet material 24 sufficiently to allow it retain the embossed pattern after the sheet material 24 is separated from the belts 106 and 320. For example, the cooling system may include a cooling roller. Alternatively, a suitable pressurized cooling station, such as that discussed above, may be utilized.

In the embossing system 300 (FIG. 9), the belt 320 is transparent, and radiant energy from the radiant heating system 340 passes through the belt 320, to be absorbed by the sheet material 24 and/or the patterned belt 106. The patterned belt 106 then patterns one side of the sheet material 24. The cooling system 350, which cools the sheet material 24, may be on either side of the belts 106 and 320.

Another configuration, shown in FIG. 10, has the radiant heating system 340 on an opposite side of the belts 106 and 320. The system 400 thus has a flexible belt 106 at least part of which is transparent, with radiant energy absorbed by the sheet material 24 or part of the flexible belt 106. Alternatively, the belts may be both absorptive; in this case, the radiation is absorbed on the backside of a belt and conducted through to the other side.

It will be appreciated that many alternative configurations of the radiant heating system 340 and the cooling system 350 are possible. For example, the cooling system 350 may be on both sides of the belts 106 and 320.

It will be appreciated that both sides of the sheet material 24 may be patterned at the same time using the systems 300 and 400.

Figure 10A:
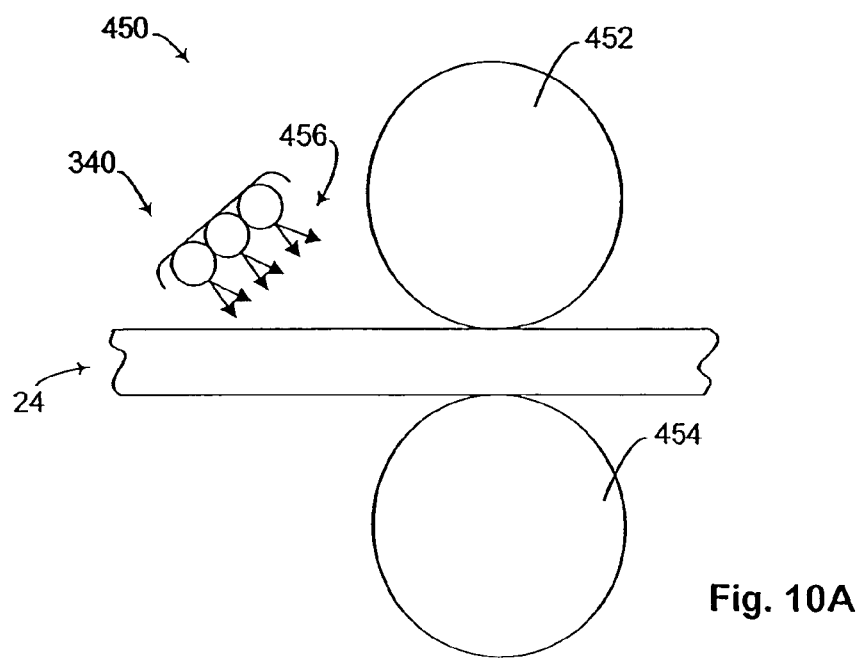
FIG. 10A is a side view of still another alternate embodiment embossing system in accordance with the present invention.

Turning now to FIG. 10A, a system 450 is shown in which a single radiant heating system 340 heats a pair of rollers 452 and 454 on opposite respective sides of a sheet material 24. The sheet material 24 is made of a relatively transparent material, which allows radiant energy 456 to pass through the sheet material 24 and heat the lower roller 454. Thus a single heating system 340 may be utilized to heat rollers on both sides of the sheet material, for example for patterning both sides of the sheet material 24.

Figure 10B:
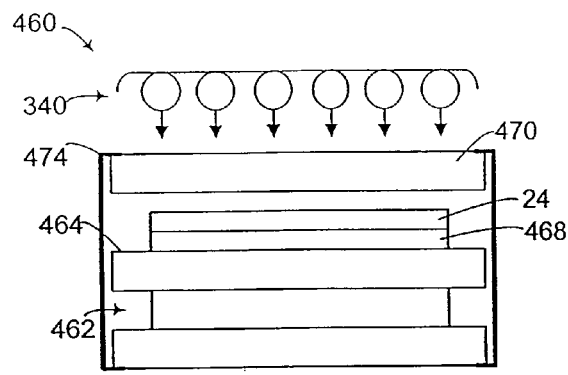
FIG. 10B is a side view of a further alternate embodiment embossing system in accordance with the present invention.
Figure 11:
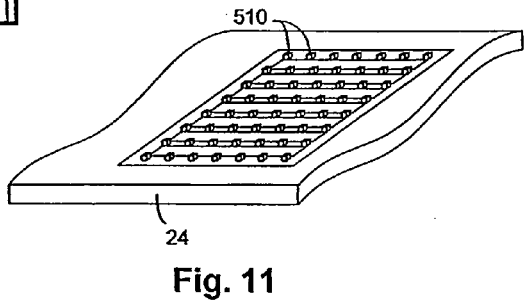
FIG. 11 is an isometric view of a sheet material with posts, embossed in accordance with the present invention.

Another embossing system, a press system 460, is illustrated in FIG. 10B. The system 460 includes an air cylinder 462 having a lower press platform 464, a platen 468 upon which the sheet material 24 is placed, and an upper press 470, all held together by a frame 474. In addition, the press system 460 includes a heating system 340, for providing radiant energy to soften and/or melt the sheet material 24.

The upper press 470 may be made of a relatively transparent material, such as quartz, which allows radiant energy 478 emitted by the heating system to pass therethrough for absorption by the sheet material 24. The upper press 470 may be a tool that includes a patterned lower surface for patterning the sheet material 24.

Operation of the press system 460 is as follows: the sheet material 24 is arranged on the platen 468, which is then placed on the lower press platform 464 of the air cylinder 462. The air cylinder is then used to press the sheet material 24 against the upper press 470. Once pressure has been applied, the heating system 340 may be activated for a set period of time, such as on the order of seconds, to soften or melt the sheet material 24, with the patterned surface of the upper press 470 thereby patterning the sheet material 24. The sheet material 24 is then cooled, for example by blowing cool air over the system, before the pressure of the air cylinder is removed and the platen 468 and the sheet material 24 are removed.

The press system 460 may include additional features, such as pins on the lower press platform 464 to aid in alignment of the platen 468 and the sheet material 24. The heating system 340 may be movable, so that it can be raised and lowered relative to the rest of the system.

In an exemplary embodiment, the press system 460 may be used to pattern material pieces up to six inches (15.2 cm) in diameter. The upper press 470 may be approximately one inch (2.54 cm) thick, and the heating system 340 may be within about 1.5 inches (3.8 cm) of the sheet material 24.

It will be appreciated that the press system 460 is only one of a variety of press systems for patterning the sheet material 24. Many variants are possible. For example, the platen 468 may be patterned instead of or in addition to the upper press 470. The platen 468 may be omitted, with the sheet material 24 pressed between the upper press 470 and the lower press surface 464 of the cylinder 462. Pressure-producing devices other than air cylinders may be employed, although it will understood that the air cylinder 462 provides a means of evenly providing pressure along the sheet material 24.

Figure 10C:
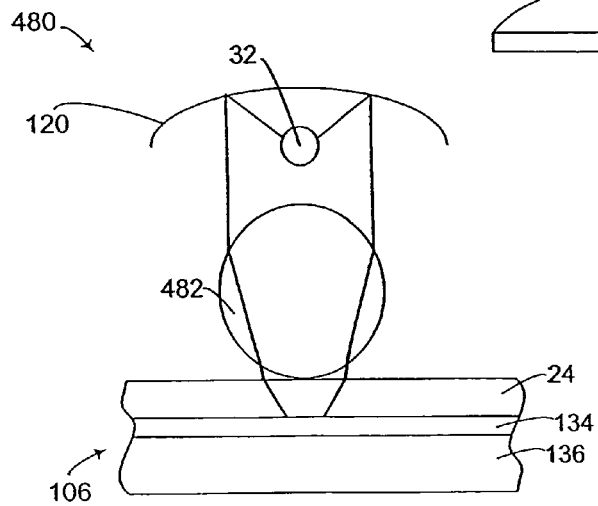
FIG. 10C is a side view of a still further alternate embodiment embossing system in accordance with the present invention.
Figure 12:
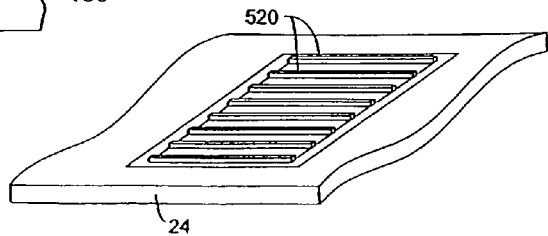
FIG. 12 is an isometric view of a sheet material with ribs, embossed in accordance with the present invention.
Figure 13:
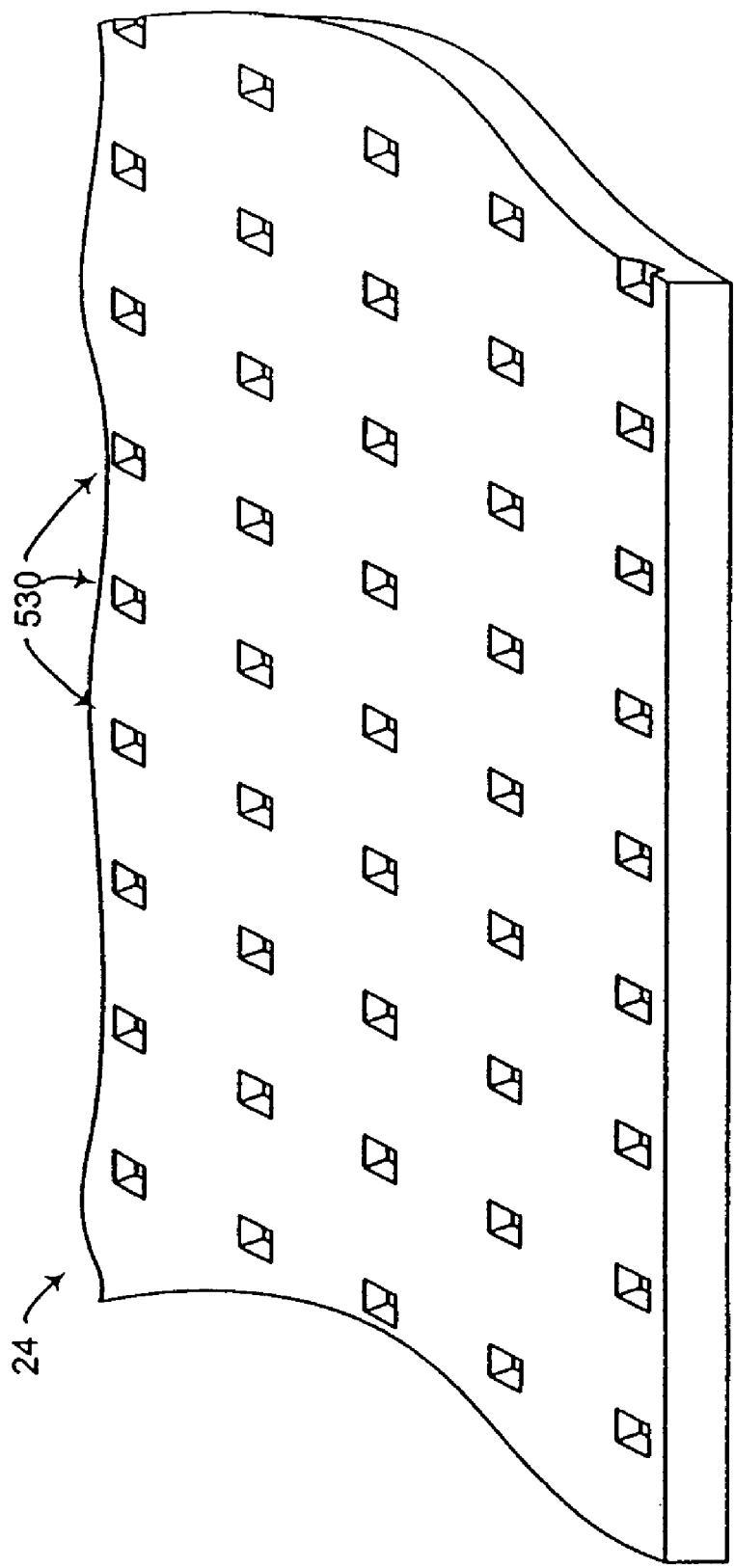
FIG. 13 is an isometric view of a sheet material with recesses, embossed in accordance with the present invention.

FIG. 10C illustrates yet another embodiment, an embossing system 480. The system 480 utilizes a roller 482 of transparent material to focus radiant energy from the radiant energy source. The radiant energy emerges from the radiant energy source 32, and may be reflected by the reflector 120 toward the sheet material 24. The reflector 120 and the transparent roller 482 focus the radiant energy, and the sheet material may focus the radiant energy further. The radiant energy is absorbed in the tooling surface 134, which along with the flexible backing 136 makes up the patterned belt 106.

It will be appreciated that the system 480 shown in FIG. 10C may be modified, if desired, to allow heating of an absorptive portion of the sheet, such as an absorptive layer similar to the absorbent lower layer 146 shown in FIG. 7, as opposed to or in addition to heating the tooling surface 134.

Figure 14:
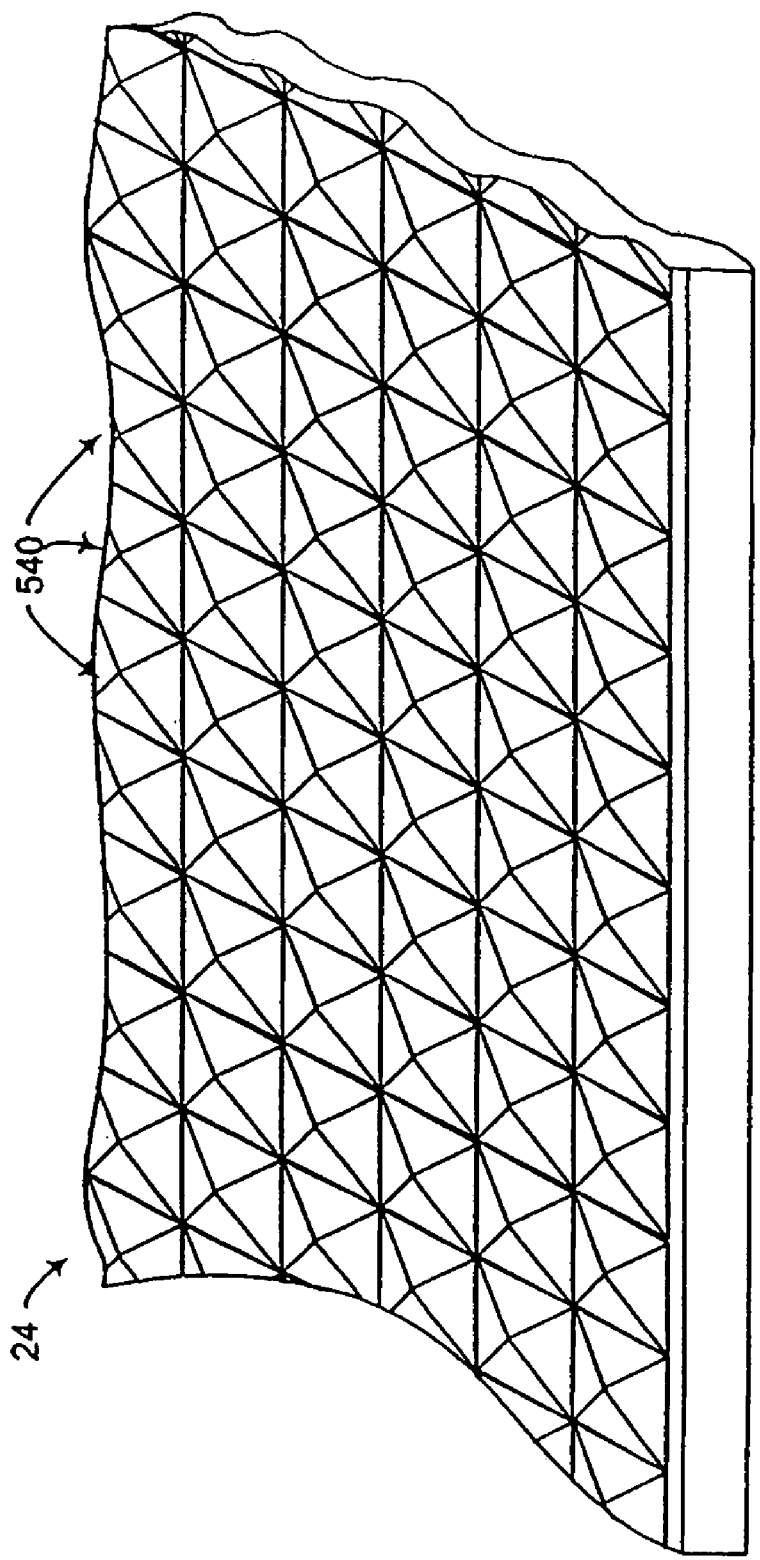
FIG. 14 is an isometric view of a sheet material with faceted protrusions, embossed in accordance with the present invention.

FIGS. 11-14 show various types of patterned microstructures that may be formed on the sheet material 24. The sheet material 24 may have an array of posts 510 (FIG. 11); may have an array of ribs 520 (FIG. 12); may have an array of recesses 530 (FIG. 13), such as for receiving microstructure elements, also known as nanoblocks; or may have an array of faceted protrusions 540 (FIG. 14). Further details regarding the microstructure elements may be found in U.S. Pat. Nos 5,545,291 and 5,904,545, which are incorporated herein by reference in their entireties. It will be appreciated that the sheet material 24 may alternatively have other types of microstructures embossed thereupon, and that the sheet material 24 may alternatively have larger structures patterned thereupon.

Figure 15:
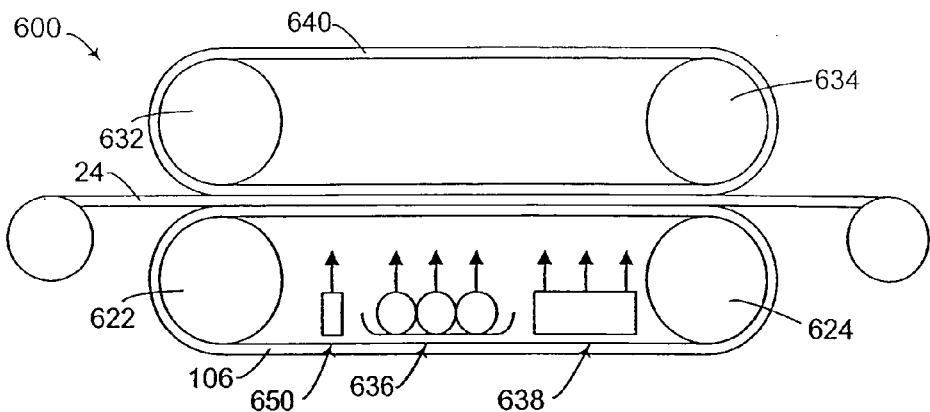
FIG. 15 is a side view of another alternate embodiment embossing system, for embossing both sides of a sheet material, in accordance with the present invention.
Figure 16:
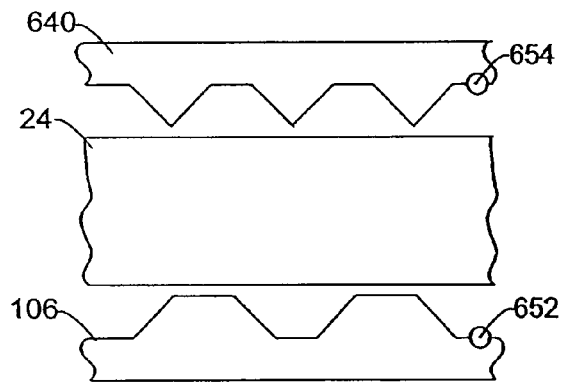
FIG. 16 is a side view of part of the system of FIG. 15, illustrating the alignment process.
Figure 17:
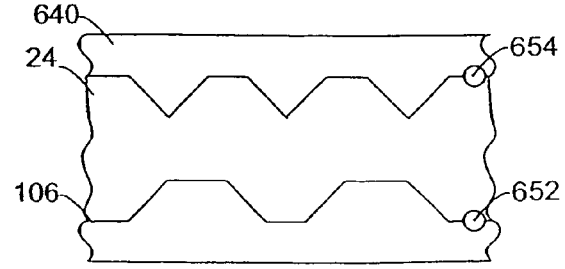
FIG. 17 is a side view of part of the system of FIG. 15, illustrating the embossing process.

FIGS. 15-17 show an embossing system 600 for embossing both sides of a sheet material 24. The system 600 may include parts, such as a patterned belt 106, and rollers 622, 624, 632, and 634, a heating system 636, and a cooling system 638, all of which may be similar to corresponding parts of the systems 300 and 400 shown in FIGS. 9 and 10 and described above. In addition, the system 600 includes a second patterned belt 640, allowing the sheet material to be embossed on both sides (major surfaces) thereof. As shown in FIGS. 16 and 17, the patterned belts 106 and 640 may have different patterns. It will be appreciated that alternatively the belts 106 and 640 may have substantially the same pattern, or may have patterns of complimentary shape.

The system 600 includes an alignment mechanism 650 for obtaining suitable alignment between the patterned belts 106 and 640. The alignment mechanism 650 enables precise alignment between the patterned belts 106 and 640, allowing a desired spatial relationship between the patterns formed on the opposite sides of the sheet material 24. The belts 106 and 640 may have respective alignment marks 652 and 654 on them. The alignment mechanism 650 may use optical methods to align the alignment marks 652 and 654, thereby assuring that the belts 106 and 640 are in the desired relative spatial relationship. For example, the alignment mechanism 650 may shine a light through the belt 106 and the sheet 24, and may include a light receiver, such a phototube or CCD, for determining whether the alignment marks 652 and 654 are aligned. The alignment marks 652 and 654 may be suitably configured so as to create or avoid optical interference when aligned. Thus the belt 106 may be transparent to a suitable wavelength of visible or non-visible light utilized by the alignment mechanism 650. If necessary, the belt 640 may include a reflective coating or backing to send light back to the alignment mechanism, in order to allow checking of whether the alignment marks 652 and 654 are aligned.

It will be appreciated that other sorts of alignment mechanisms, such as suitable types of non-optical mechanisms may be used in the alignment mechanism 650. For example, the sheet 24 may have sprocket holes that engage protrusions on the belts 106 and/or 640, to mechanically align the sheet 24 and the belts 106 and 640.

The alignment mechanism 650 has been described above in connection with a double band press. It will be appreciated that alignment mechanisms such as the alignment mechanism 650 may be even more suitably employed in connection with other embossing processes, such as a batch or stepwise (step and repeat) process.

Figure 18:
FIG. 18 is a side view of one embodiment of a product that may be produced using the system of FIG. 15.
Figure 19:
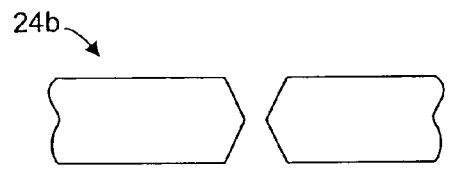
FIG. 19 is a side view of another embodiment of a product that may be produced using the system of FIG. 15.
Figure 20:
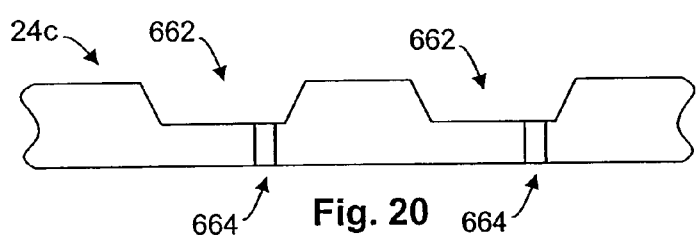
FIG. 20 is a side view of yet another one embodiment of a product that may be produced using the system of FIG. 15.
Figure 21:
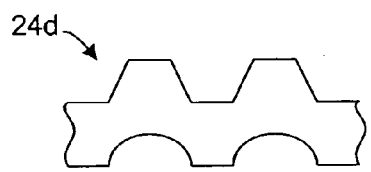
FIG. 21 is a side view of still another embodiment of a product that may be produced using the system of FIG. 15.

The system 650 may be used to produce embossed sheets 24 with a variety of patterns. A few examples of suitable patterns are shown in FIG. 18-21. FIG. 18 shows a micro-corrugated film 24a, which may be used for example for optical applications, or to increase surface area. FIG. 19 shows a sheet 24b with two-sided through holes 660 to create an undercut structure. Optionally an additional film may later be laminated onto the sheet 24b. FIG. 20 shows a sheet 24c having wells 662 on one major surface, and vias 664 placed in a desired location relative to the wells 662, either in the center of the wells 662 or at another location relative to the wells 662. FIG. 21 illustrates one example of a sheet 24d having optical devices thereupon. The optical devices on the sheet 24d have one surface 670 that is an optical collector, and an opposite surface 672 that directs and distributes the light in a desired direction.

It will be appreciated that many other sorts of two-sided embossed sheets may be produced using a suitable system such as the system 600. The structure may have microfluidic channels with wells for sample injection, for extraction, and/ or for testing probe insertion. As another example, the structure may be a two-sided abrasive film. The two-sided embossing may be used to vary bioreactivity of implants on the two sides. As another alternative, high density interconnects for microelectronics may be formed, for example including blind vias on both sides of the sheet. Heat management devices may be created, with for example condenser shapes on one side and evaporator shapes on the other side, with through-holes linking the condensers and evaporators. Wells coupled to through-holes may be utilized for heat management in electronic systems, with integrated circuits placed in the wells and a channel and/or through-hole structure used to the dissipate heat.

Figure 22:
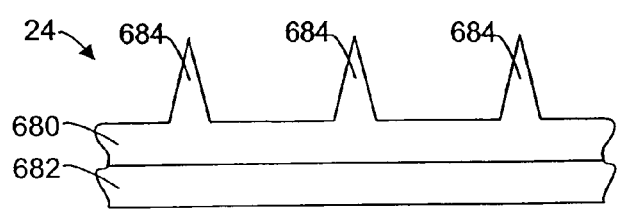
FIG. 22 is a side view of a first embodiment multi-layer product that may be embossed according the present invention.
Figure 23:
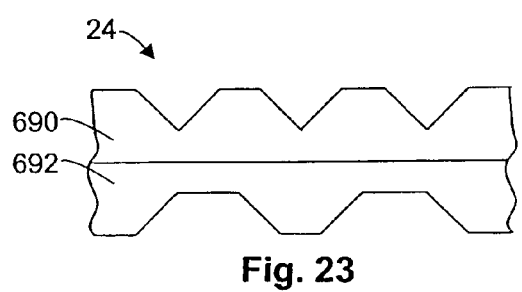
FIG. 23 is a side view of a second embodiment multi-layer product that may be embossed according the present invention.
Figure 24:
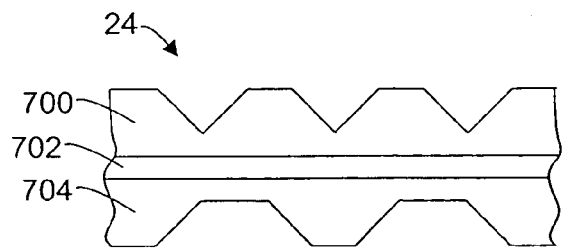
FIG. 24 is a side view of a third embodiment multi-layer product that may be embossed according the present invention.

Turning now to FIGS. 22-24, one benefit of embossing using the systems described above is that multilayered sheets may have their integrity maintained during embossing, even though the different materials of the different layers may have different material properties, for example having different glass transition temperatures and/or different melting temperatures. By concentrating radiation-absorbing materials in layers or portions of layers to be embossed, softening of materials by heating may be localized, and heating may be minimized in other layers or portions of layers, which may otherwise have their integrity and/or material properties adversely affected.

FIG. 22 shows a multilayer sheet or film 24 having a first layer 680 and a second layer 682. The layers 680 and 682 may be made or different materials or may otherwise have different material properties. The first layer 680 has conical protrusions 684 thereupon that are formed by embossing, using systems such as those described above. The second layer 682 remains relatively unheated during the embossing process, as radiant heat (such as from a radiant heating system) is concentrated toward the embossed portion. The radiant heat that is preferentially concentrated toward all or a portion of the first layer 680 may be either directly absorbed by all or a portion of the first layer 680. Alternatively, the radiant heat may be absorbed by a suitable tool, and then used to heat all or a portion of the first layer 680.

By concentration heating on all or a portion of the first layer 680, undesired substantial heating of the second layer 682 may be avoided. This may reduce or eliminate problems that may occur if uniform heating of the sheet 24 were to be used instead. These problems may include softening of the second layer 682, melting of the second layer 682, and/or mixing of the layers 680 and 682 or other breakdown of the integrity of the layers.

The first layer 680 may have a lower glass transition temperature and/or melting temperature than the second layer 682. The melting temperature of the first layer 680 may be lower than the glass transition temperature of the second layer 682.

The second layer 682 may be less stiff than the first layer 680. Thus the protrusions 684 may be relatively stiff, with a more flexible backing material, the second layer 682. The fist layer may include a suitable polymeric material.

In a specific example embodiment, the first layer 680 may be polysulfone that is 3 mils thick, and the second layer 682 may be a co-extrusion of polypropylene and one of the following: styrene butadiene styrene, styrene isopriene, or styrene ethylene butadiene styrene, each 1 mil thick It will be appreciated that a wide variety of structures may be embossed on the first sheet 680.

FIG. 23 shows a multilayer film or sheet 24 that includes first and second layers 690 and 692, both of which are embossed, on opposite major surfaces of the sheet 24. The layers 690 and 692, or portions thereof, may be suitably doped to provide the desired heating for embossing. For example, the first layer 690 may have a higher glass transition temperature than the second layer 692, and thus may require more heating. The first layer 690 may thus have a higher doping level of radiation-absorbing materials than the second layer 692. This enables the first layer 690 to absorb more radiant energy, and thus reach a higher temperature, than the second layer 692.

It will be appreciated that the concentration or doping level of radiation-absorbing material within each of the layers 690 and 692 may be non-uniform. For example, the concentration may be limited to the portion of each of the layers nearest the embossed surface. The radiation-absorbing material may be limited to half the depth of each of the layers 690 and 692, for example.

FIG. 24 shows a multilayer sheet 24 having a first layer 700, a second layer 702, and a third layer 704, with the second layer 702 between the first layer 700 and the third layer 704. The first and third layers 700 and 704 may be heated using radiant heating, while leaving the second layer 702 substantially unheated. The radiant energy may pass through the second layer 702 substantially unabsorbed. The second layer 702 may be of a material with a lower glass transition temperature than either the first layer 700 or the third layer 704. Yet because of the selective absorption of heat in the first and third layers, the second layer 702 may be substantially unheated. Thus a heat sensitive layer, such as an adhesive layer, may be included in a material to be embossed, without risk of damage from excessive heating in the embossing process.

While the second layer 702 is described above as being "substantially unheated," it will be appreciated that alternatively the second layer 702 may undergo some sort of heating, albeit less heating than the first layer 700 or the third layer 704. Put another way, the second layer may be less absorptive of the radiation of the heating system than the first layer 700 and the third layer 704.

The layers of the various multilayer sheets of FIGS. 22-24 have been described as having their absorptivity of radiant energy controlled by addition of different amounts of radiation-absorbing material. It will be appreciated that the different materials in the different layers may themselves have different radiation-absorbing characteristics.

Selective heating and embossing of multilayer materials may be used to produce a wide variety of types of products:

a) An embossed layer may overlie a layer that maintains its orientation during the embossing process.

b) Embossing may be accomplished on one major surface while maintaining structures, such as embossed structures, on the other major surface.

c) One of the layers may include a ferromagnetic composite, with the other layer including a conductive material.

d) Through holes or other structures may be embossed in the hydrophobic layer of a hydrophobic/hydrophilic co-extruded film, without affecting the hydrophilic nature of the underlying film, and without causing the films to blend together.

e) A surface film over a holographic layer may be embossed, without destroying the holographic characteristics.

f) A reflective film that overlies a peel layer may be embossed.

g) A surface layer over a heat-activated film may be embossed without activating the underlying film.

h) Microembossed structures may be formed over a thermally-doped electrically conductive film, without disturbing the electrically conductive properties of the conductive film.

i) A structure may be embossed on a plastic display device.

j) A pattern, such as a waffle pattern, may be made atop a layer with active ingredients. For example, the underlying layer may contain a cleaning solution and the top layer may have patterned hard material suitable for scrubbing.

With regard to preservation of film orientation in the embossing process, the orientation to be maintained may be a uniaxial or biaxial orientation, for example to be used in orienting liquid crystals. For example the embossing processes such as described herein may be used to create holes or other microstructures in oriented film, while enabling the oriented film to maintain its strength and/or other desirable properties. Applications for such films include filtration, products that are in contact with skin, and packaging.

Another potential application for the heating and embossing processes described herein is in preservation of article or filler distribution.

Yet another potential application for the heating and embossing processes described herein is embossing thermally-sensitive materials, while allowing them to retain substantial thermally-sensitive properties. Such thermally-sensitive materials may decompose or may react, when heated excessively. For example, a sheet material may have a subsurface material, such as a fragrance, that would be adversely affected by heat. Other examples of material that would be adversely affected or degraded by heat include certain surfactants or pharmaceuticals.

It will be appreciated that some of the benefits described above with regard to multi-layer films may also be applicable to single-layer single-material sheets, where only part of the sheet that is to be embossed is heated. A surface portion of the sheet may be heated and embossed, while an underlying portion of the sheet is substantially unheated, or is heated by a lesser amount. The surface portion that is heated and embossed may extend from about 0 to about 50 per cent of the depth of the sheet, for example. By selectively heating only a portion of the sheet, the properties of the bulk part of the sheet may be maintained. The preferential heating of the surface portion of the film may be accomplished by selective placement of radiation-absorbing material along the surface of the sheet. Alternatively, the sheet as a whole may highly absorb radiant energy, with substantially all or most of the radiant energy absorbed at the surface.

Figure 25:
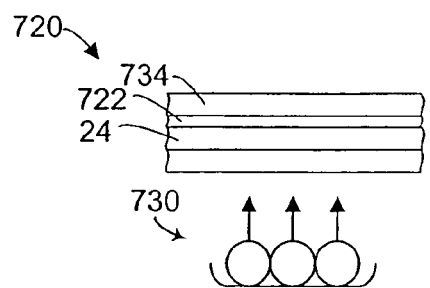
FIG. 25 is a side view of a part of one embodiment of an embossing system that utilizes a stencil, in accordance with the present invention.
Figure 26:
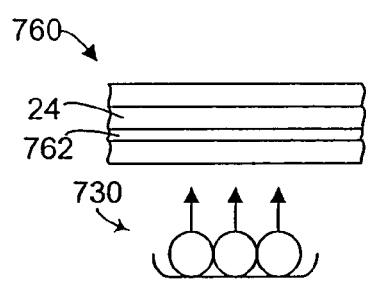
FIG. 26 is a side view of a part of another embodiment of an embossing system that utilizes a stencil, in accordance with the present invention.

With reference now to FIGS. 25-28, embossing may be carried out in a selective manner, on only a selected portion of a major surface of a sheet 24. As shown in FIG. 25, an embossing system 720 includes a stencil 722 between a heating system 730 and a patterned belt 734, which is made of a material that absorbs the radiant energy. As shown in FIG. 26, an embossing system 760 includes a stencil 762 between a heating system 770 and the sheet material 24 being embossed, wherein the sheet 24 includes a material that absorbs the radiant energy. The stencils 722 and 762 include a material that reflects the radiant energy, not allowing it to pass therethrough. In both of the systems 720 and 760, the stencils 722 and 762 block radiant energy from impinging upon parts of the patterned belt 734 and/or the sheet 24, thereby limiting heating to parts of the belt 734 and/or the sheet 24. Thus embossing may be limited to parts of the sheet 24 corresponding to openings in the stencils 722 and 762.

Figure 27:
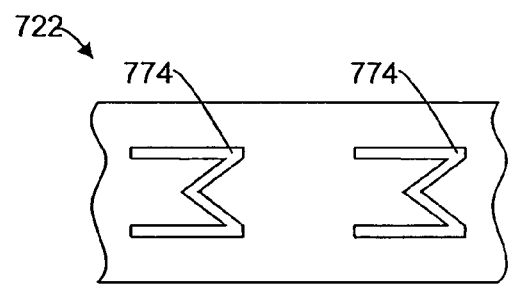
FIG. 27 is a plan view of a stencil for use with the systems of FIGS. 25 and 26.

An example of a stencil 722, with openings 774, is shown in FIG. 27. The stencil 762 may have a similar configuration. It will be appreciated that the stencils 722 and 762 may have a wide variety of suitable configurations. For example, the stencil 722 or 762 may allow one or more words or symbols to be embossed on the sheet 24 to form a retroreflective portion of the sheet 24, for example for use in a traffic sign.

Figure 28:
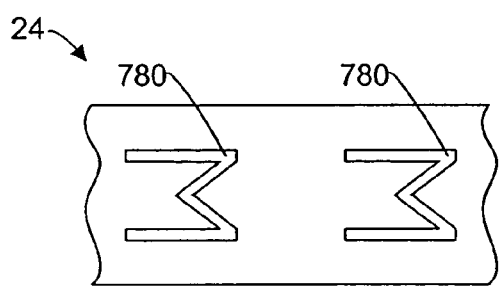
FIG. 28 is a plan view of sheet of material with selectively applied radiation-absorbing material, in accordance with the present invention.

As shown in FIG. 28, selective embossing may be accomplished by selectively doping or dyeing portions 780 of the sheet 24 with radiantly-absorptive material. Such doped or dyed portions 780 are preferentially heated with radiant energy relative to other portions of the sheet 24, allowing the doped or dyed portions 780 to be selectively embossed.

Although the process has been described above as a selective embossing process, it will be appreciated that the systems and processes may be utilized for selective heating of the sheet 24 for purposes other than embossing. For example, selective heating may utilized to locally initiate a chemical reaction or locally change material properties of the sheet 24.

It will be appreciated that the selectively heating and/or embossing described above may be used in a variety of circumstances to produce a variety of devices. For example, selective hot spots may be created in a material to initiate a reaction with dopants for bonding, or for generating voids through an out-gassing reaction. As another example, selective heating may be used to trigger nucleating agents in selected areas to enhance, for example, localized crystallinity for change in refractive index, light transmission, or other properties. As a further alternative, an optically-sensitive or gas-sensitive region may be selectively embossed. Selective embossing may also be used to emboss features that require multiple embossing steps to produce different features that are close together. Devices with patterned differences of material properties, for example channels of crystalline vs. amorphous polymer materials, may also be produced.

Systems described above may be used to emboss thicker materials than may normally be embossed using conventional systems. Thick materials may be difficult to emboss using bulk heating methods such as flame heating, due to the difficulty of evenly heating the material, and due to the relatively large amount of energy involved in heating all or substantially all of a thick material. With radiation heating of the sheet 24, especially with the radiation passing into and/or being absorbed within parts of the sheet 24, heating may be more localized. Embossing may thereby be accomplished without overheating parts of the sheet, which otherwise may need to be done to insure that the portions to be embossed are sufficiently heated.

In addition, embossing of thick materials using conventional heating may be cost-prohibitive because of the high energy costs and low line speeds involved. Systems and methods using radiative heating, such as those described herein, may allow less costly embossing of thick materials, with energy costs and line speeds that may be as low as or nearly as low as costs for thin materials. This may be due at least in part to selective softening of only a surface portion of the thick sheet material.

The thickness of materials embossed using the systems described above may include materials that have a greater thickness than the 5-7 mils (0.13-0.18 mm) thick materials normally embossed using other systems or processes. For example, systems and methods described above may be able to emboss materials that are greater than about 1 inch (25.4 mm) thick, or even greater than about 2 inches (50.8 mm) thick. Examples of such thick materials may include microfluidic assemblies, Fresnel lenses, retroreflective markers, such as traffic markers.

Figure 29:
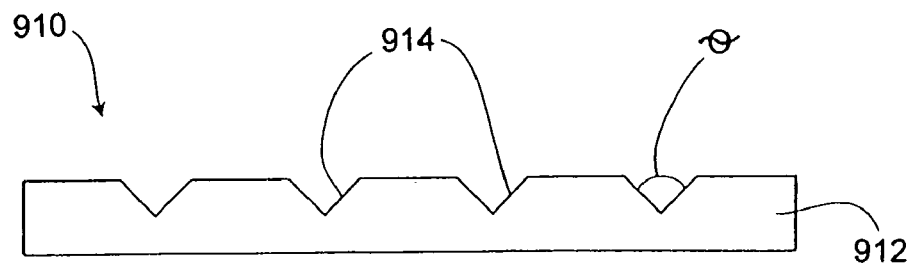
FIG. 29 is a cross-sectional view of an embossed film in accordance with the present invention
Figure 30:
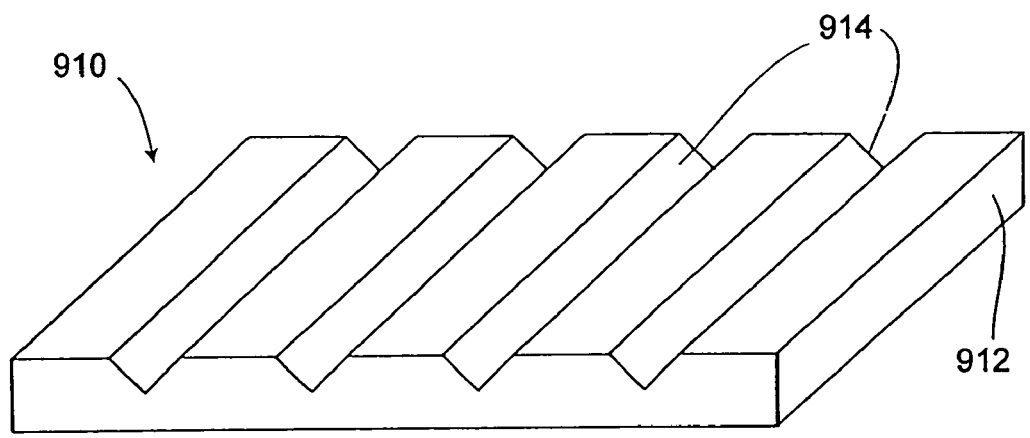
FIG. 30 is a perspective view of an embossed film in accordance with the present invention.

Referring now to FIGS. 29 and 30, these figures show an embossed oriented film, for example using systems and methods described above. Optical film 910 comprises uniaxially oriented film 912 with microchannels or grooves 914 embossed in its upper surface. Microchannels 914 have a longitudunal direction (See FIG. 30) that is substantially parallel to the direction of orientation of film 912. In the illustrated embodiment, microchannels 914 are v-shaped grooves having a top angle θ. Each of the individual microchannels 914 may be of substantially the same size and shape as shown in FIG. 30, or of different sizes and shapes. Microchannels 914 may have a cross-sectional shape that is V-shaped, rectangular, trapezoidal, semi-circular or sinusoidal.

In one embodiment, the individual microchannels 914 have a depth in the range of about 1 micron to about 100 microns, and in another embodiment, about 10 microns to about 100 microns. In yet another embodiment, the depth of the microchannels is about 40 microns to about 60 microns. The width of the individual microchannels 914, in one embodiment is within the range of about 0.2 microns to about 500 microns, and in another embodiment within the range of about 10 microns to about 100 microns. Top angle θ can be within the range of about 20° to about 120°, or about 60° to about 90°.

Microchannels 914 may be spaced apart a distance of about 0.2 microns to about 500 microns in one embodiment, or about 100 microns to about 200 microns in another embodiment.

Oriented Films

Embossed uniaxially oriented film 912 comprises a thermoplastic polymer. Oriented thermoplastic polymer films are prepared by methods known in the art, such as by heating the polymer to a temperature near or above the softening transition temperature, followed by stretching in one direction (uniaxial orientation) or two directions (biaxial orientation). Typically, a polymer sheet is extruded and then oriented by rapid stretching at a desired temperature to form an oriented film, followed by rapid quenching. Quenching ensures that the orientation is not lost by molecular relaxation. Orientation can occur in the direction of film motion, referred to as machine direction (MD). Stretching in the direction orthogonal to the machine direction is referred to as transverse (TD) or cross direction.

Mechanical properties of oriented films vary depending upon the direction and degree of orientation. Orientation brings out the maximum strength and stiffness inherent in the polymer film. In addition, orientation induces even higher levels of crystallinity so that properties like barrier and chemical inertness are further enhanced. Optical properties are generally superior, since orientation leads to a crystalline structure that scatters much less light than the crystalline domains formed in unoriented films.

The embossed film described herein may be a uniaxially oriented film, and not a biaxially oriented film. In one embodiment, the stretch ratio of the oriented film is in the range of about 4-5×MD and 1×TD. Amorphous glassy thermoplastic films and semi-crystalline thermoplastic films are suitable for use in making the embossed oriented film by the methods described herein.

Suitable oriented amorphous glassy thermoplastic films include those comprising acetates such as cellulose acetate, cellulose triacetate and cellulose acetate/butyrate, acrylics such as polymethyl methacrylate and polyethyl methacrylate, polystyrenes such as poly(p-styrene) and syndiotactic polystyrene, and styrene-based copolymers, vinylics such as polyvinyl chloride, polyvinyl fluoride, polyvinylidene chloride, polyvinylidene fluoride, polyvinylidone dichloride and mixtures thereof.

Suitable oriented semi-crystalline thermoplastic films include those comprising polyolefin homopolymers such as polyethylene and polypropylene, copolymers of ethylene, propylene and/or 1-butylene; copolymers containing ethylene such as ethylene vinyl acetate and ethylene acrylic acid; polyoxymethylene; polyesters such as polyethylene terephthalate, polyethylene butylrate, polybutylene terephthalate and polyethylene napthalate; polyamides such as polyhexamethylene adipamide; polyurethanes; polycarbonates; polyhexamethylene adipamide; polyurethanes; polycarbonates; polyvinyl alcohol; ketones such as polyetheretherketone; polyphenylene sulfide; and mixtures thereof.

As used herein, the term "anisotropic" means that the polymer film has different reflective properties along the orthogonal in-plane axes. Anisotropic films are described in International Publications WO02/48607 and WO01/90637. Particularly suitable as the anisotropic optical film are polyethylene terephthalate (PET) and polyethylene naphthalate (PEN).

In one embodiment, the anisotropic material is a birefringent polymeric material. Such a birefringent polymer has an extraordinary refractive index $n_e$ along its optical axis and an ordinary refractive index $n_o$ along the axes orthogonal thereto. Dependent on the particular material, $n_e > n_o$ or $n_e < n_o$. The birefringence of the film, $\Delta n$, is the difference between the ordinary refractive index and the extraordinary refractive index. The birefringence of the anisotropic material in this embodiment may be in the range of 0.1 to 0.5.

In one embodiment, a multilayer film may be used as the embossed film. Examples of multilayer films include layers of films that are formed by co-extrusion with one or more other polymers, films coated with another layer, or films laminated or adhered together. The surface of the multilayer film to be softened and embossed is the anisotropic, uniaxially oriented film surface.

Isotropic Layer

Figure 31:
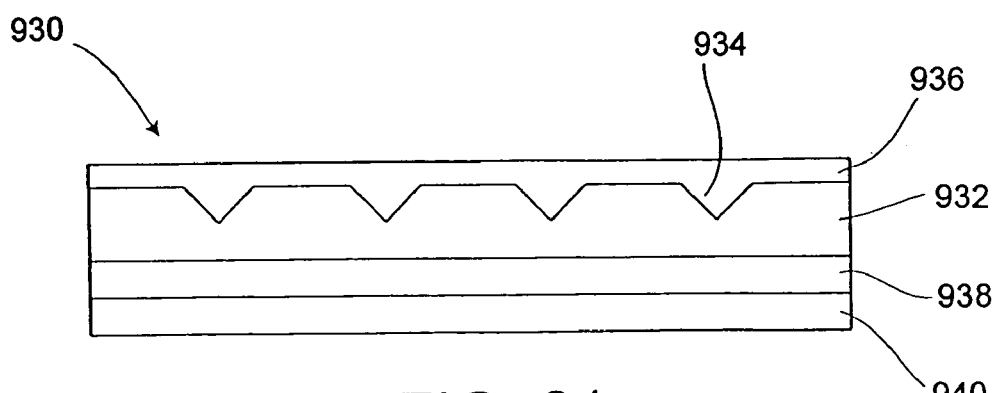
FIG. 31 is a cross-sectional view of a lightguide incorporating the embossed film of the present invention.

In one embodiment, the anisotropic embossed film is coated with an optically isotropic layer on its embossed surface. This embodiment is illustrated in FIG. 31, in which lightguide 930 comprises embossed anisotropic film 932 having an isotropic coating 36 overlying its upper surface and embossed microchannels 934. Isotropic materials are described in International Publications WO02/48607 and WO01/90637. The refractive index of the isotropic material is $n_i$, which is substantially equal to one of the refractive indices of the anisotropic layer $n_e$ or $n_o$. Suitable isotropic materials comprise, for example, polymethylmethacrylate, polystyrene, polycarbonate, polyether sulphone, cyclic olephine copolymers, crosslinked acrylates, epoxides, urethane and silicone rubbers. In one embodiment, the isotropic material comprises bisphenol A ethoxylated diacrylate with a photoinitiator, which is UV cured.

In one embodiment, the refractive index of the isotropic coating ($n_i$) is equal to the ordinary refractive index ($n_o$) of the anisotropic film so that the emitted light is linearly polarized.

Adhesives

The embossed film may be coated with an adhesive on its unembossed surface to adhere the embossed film to another optical layer or substrate. Suitable adhesives include hot-melt coated formulations, water-based, and latex formulations, as well as laminating, and thermally-activated adhesives. The adhesive layer can be applied to the film by conventional techniques.

Examples of suitable adhesives include polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-butadiene polymer; poly-alpha-olefin; amorphous polyolefin; silicone; ethylene-containing copolymer such as ethylene vinyl acetate, ethylacrylate, adn ethyl methacrylate; polyurethane; polyamide; epoxy; polyvinylpyrrolidone and vinylpyrrolidone copolymers; polyesters and mixtures of the above. Additionally, the adhesives can contain additives, such as tackifiers, plasticizers, fillers, antioxidants, stabilizers, pigments, diffusing particles, curatives and solvents.

Suitable adhesives according may be pressure sensitive adhesives. Pressure sensitive adhesive are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

The adhesive may be used to laminate the embossed film to a substrate or to another optical layer, such as a waveguide plate. Referring to FIG. 31, embossed film 932 has adhesive layer 938 adhered to its lower, unembossed surface. Adhesive layer 938 adheres the embossed film 932 to substrate 940, which can be a conventional polymeric substrate such as polymethyl methacrylate. The adhesive can be selected based on its refractive index so that it does not interfere with the functioning of the waveguide plate.

The adhesive layer on the embossed film may have a removable liner adhered thereto. The liner protects the adhesive layer and prevents inadvertent bonding prior to use. The liner that can be used can be any release liner known in the art.

Embossing Method

A method of embossing an optical film includes: heating at least a portion of the optical film indirectly with radiant energy from a radiant energy source; pressing a tool against the heated portion of the optical film, thereby patterning a surface of the optical film; and separating the optical film and the tool. The radiant energy may travel through a solid material that is relatively transparent to radiation, on its way to being absorbed by a relatively-absorptive material. The relatively-transparent material may be an unheated portion or all of the optical film, and the relatively-absorptive material may be the tool. The method may be performed as one or more roll-to-roll operations. Alternatively or in addition, the method may include one or more batch processes.

The systems and methods described above may involve heating and embossing processes that at least partially overlap in time, and therefore to at least some extent are performed simultaneously. By overlapping the heating and the embossing in time, several advantageous process characteristics may be achieved, including reducing energy losses and reducing unwanted changes in material shape.

At least some of the systems and methods described above also have the advantage of containing the sheet material 24 during the heating and embossing processes. By containing the sheet material 24, such as between a pair of belts, planarity of the sheet material may be better maintained, when compared to processes where the sheet material is not contained or constrained on both sides.

Radiant heating using radiant heaters, such as NIR heaters, provides several advantages compared to heating using flame heaters. Flameless radiant heaters may provide a safety advantage, in that they do not utilized open flames, and may thus be used in environments where it would be unsafe to use an open flame. In addition, NIR heaters and other flameless radiant heaters may provide better output controllability than flame heaters. The output of flame heaters may change based on environmental and other conditions, such as changes in ambient temperature, pressure, and/or humidity, and/or variations in fuel characteristics. Contamination caused by combustion by-products of flame heaters may also be avoided by use of flameless heaters. The heat produced by flame heaters also tends to be relatively broad in its wavelength range. Thus heat from a flame heater is well-absorbed by a wide variety of materials, while heat from a flameless radiant heater may be more selectively absorbed, allowing more localization in heating. Of course, localization in heating enables embossing to be performed with less energy and fewer undesirable side effects.

The radiant energy utilized in the above systems and/or methods may be near-infrared energy, for example utilizing NIR-type heaters available from Advanced Photonics Technologies AG. Other suitable radiant heaters and emitters are available from Phillips, Ushio, General Electric, Sylvania, and Glenro. The radiant energy may have most of its energy in a wavelength range of between 0.4 to 2 μm (microns).

Other types of radiant energy may alternatively or in addition be utilized. Examples of some other types of radiation that may be suitable include microwaves having a frequency of approximately 7-8 GHz. Free water within a polymer structure may be able to absorb such microwave radiation, as well as possibly radiation of other frequencies or wavelengths. Radiation having a peak wavelength of approximately 1-6 microns may also be suitable. Such radiation may be produced by suitable quartz-tungsten lamps. RF induction heating may also be employed, for example in the heating of metal tooling for embossing. High power lasers with suitable wavelength may also be used.

A variety of suitable power levels may be employed for the radiant energy source. One example embodiment utilizes a power level of approximately 14 kilowatts. However, it will be appreciated that the amount of power involved is very dependent on many factors of the process, such as the materials involved, size of the materials to be embossed, process speed, etc.

Suitable combinations of heat sources, including combinations of radiant heating with non-radiant heating, may be employed in heating the sheet material 24.

It will be appreciated that the systems and methods described above may provide significant advantages over prior systems. First, selective heating may be accomplished, focusing the heating where needed. Second, heat transfer to the material may be provided by multiple mechanisms, for example radiation from an energy source along with conduction from a tool. This may result in high heat fluxes. Further, use of multiple heat transfer mechanisms may increase flexibility of the system, by allowing the heat transfer mechanisms to be independently manipulated. With variation of such factors as tool mass and radiation time (as well as other factors), the heating profile for the sheet material 24 may be controlled, such that (for example) the film degradation is minimized, and/or the cooling time is shortened.

In addition, many of the processes are described above in terms of systems involving belts and rollers. It will be appreciated that other types of processes may embody many of the characteristics of the belt-and-roller processes. For example, embossing using presses or patterned rollers may be used alternatively or in addition to the belt processes disclosed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of embossing a sheet material, the method comprising:
    pressing a patterned tool against the sheet; and
    while maintaining the pressing, radiantly heating the sheet, using near-infrared radiant energy from a radiant energy source;
    wherein the radiantly heating includes passing the radiant energy through a relatively radiantly-transparent solid material in contact with the sheet; and
    wherein the heating includes softening at least part of the sheet.

2. The method of claim 1, wherein the radiantly-transparent material includes at least part of the tool.

3. The method of claim 2, wherein the tool is a quartz tool.

4. The method of claim 1, wherein the radiantly-transparent material is at least a part of a roller that contacts the sheet.

5. The method of claim 4, wherein the radiantly-transparent material surrounds the radiant energy source.

6. The method of claim 4, wherein the roller is interposed between the radiant energy source and the sheet.

7. The method of claim 6, wherein the radiantly heating includes focusing of the radiant energy by the roller.

8. The method of claim 1, wherein the radiant energy source includes a blackbody emitter, wherein the blackbody emitter has a temperature of at least 2000 K.

9. The method of claim 1, wherein the sheet material is an oriented material that maintains its oriented character throughout the embossing.

10. A method of embossing a sheet material, the method comprising:
    radiantly heating a relatively radiantly-absorptive portion of the sheet, using radiant energy from a radiant energy source;
    pressing a patterned tool against the relatively radiantly-absorptive portion of the sheet, wherein the pressing includes patterning a surface of the sheet; and
    separating the tool from the surface;
    wherein the heating includes passing the radiant energy through a relatively radiantly-transparent portion of the sheet before absorbing the radiant energy in the relatively radiantly-absorptive portion of the sheet;
    wherein the relatively radiantly-transparent portion has a lower absorptivity of the radiant energy than does the relatively radiantly-absorptive portion;
    wherein the radiantly heating, the pressing, and the separating, are all performed as parts of a roll-to-roll process; and
    wherein the tool is part of a patterned belt that includes a patterned tool surface and a flexible backing.

11. A method of embossing a sheet material, the method comprising:
    radiantly heating a relatively radiantly-absorptive portion of the sheet, using radiant energy from a radiant energy source;
    pressing a patterned tool against the relatively radiantly-absorptive portion of the sheet, wherein the pressing includes patterning a surface of the sheet; and
    separating the tool from the surface;
    wherein the heating includes passing the radiant energy through a relatively radiantly-transparent portion of the sheet before absorbing the radiant energy in the relatively radiantly-absorptive portion of the sheet;
    wherein the relatively radiantly-transparent portion has a lower absorptivity of the radiant energy than does the relatively radiantly-absorptive portion;
    wherein the radiantly heating, the pressing, and the separating, are all performed as parts of a roll-to-roll process; and
    wherein the radiantly heating includes passing the radiant energy through a radiantly-transparent roller.

12. The method of claim 11, wherein the passing the energy through the roller includes focusing the radiant energy.

13. The method of claim 10, wherein the portions of the sheet both include a radiantly-transparent material, and wherein the relatively radiantly-absorptive portion includes a dopant that increases radiant absorptivity.

14. The method of claim 13, wherein the dopant is substantially-uniformly distributed within a surface layer of the sheet.

15. The method of claim 13, wherein the dopant is distributed in a non-uniform pattern within a surface layer of the sheet.

16. The method of claim 10, wherein the portions of the sheet include different materials.

17. The method of claim 10, further comprising, prior to the heating, forming the sheet;
    wherein the forming includes unevenly doping the sheet with a dopant.

18. The method of claim 17, wherein the unevenly doping includes coating a surface of the sheet with the dopant.

19. The method of claim 17, wherein the unevenly doping includes impregnating a surface of the sheet with the dopant.

20. The method of claim 17, wherein the doping includes patterned doping.

21. The method of claim 10, further comprising, prior to the heating, forming the sheet;
    wherein the forming includes coating a surface of the sheet with a dopant.

22. The method of claim 10, further comprising, prior to the heating, forming the sheet;
    wherein the forming includes co-extruding the portions of the sheet material.

23. The method of claim 10, wherein the heating includes reflecting at least part of the radiant heat off of a reflector.

24. The method of claim 23, wherein the heating includes unevenly heating the sheet, wherein the unevenly heating is due at least in part to uneven distribution of a dopant within the sheeting.

25. The method of claim 10, wherein radiantly heating includes melting at least part of the relatively radiantly-absorptive portion of the sheet.

26. A method of embossing a sheet material, the method comprising:
    radiantly heating a relatively radiantly-absorptive portion of the sheet, using radiant energy from a radiant energy source;
    pressing a patterned tool against the relatively radiantly-absorptive portion of the sheet, wherein the pressing includes patterning a surface of the sheet; and
    separating the tool from the surface;

wherein the heating includes passing the radiant energy through a relatively radiantly-transparent portion of the sheet before absorbing the radiant energy in the relatively radiantly-absorptive portion of the sheet;
wherein the relatively radiantly-transparent portion has a lower absorptivity of the radiant energy than does the relatively radiantly-absorptive portion; and
wherein radiantly heating includes softening at least part of the relatively radiantly-absorptive portion of the sheet.

27. The method of claim 10, wherein the pressing the patterned tool against the sheet commences prior to the radiantly heating.

28. The method of claim 10, wherein the sheet material is an oriented material that maintains its oriented character throughout the embossing.

29. The method of claim 10, further comprising, after the heating, cooling the sheet;
wherein the cooling occurs prior to the separating.

30. The method of claim 10, wherein the radiant energy source includes a blackbody emitter wherein the blackbody emitter has a temperature of at least 2000 K.

31. The method of claim 10, wherein the tooling includes a reflective material, and wherein the heating includes passing at least some of the radiant energy through the sheet a second time, after reflection off the reflective material.

32. The method of claim 10, wherein the pressing includes pressing patterned tools against opposite major surfaces of the sheet.

33. The method of claim 10, wherein the sheet material has a layered structure that is maintained during the heating and the pressing.

34. The method of claim 10, wherein the heating and the pressing overlap in time.

35. The method claim 10, wherein the sheet material is constrained between belts during the heating and the pressing.

36. A method of embossing a sheet material, the method comprising:
heating a patterned tool, using radiant energy from a radiant energy source;
pressing the patterned tool against a surface of the sheet, thereby patterning the surface of the sheet; and
separating the tool from the surface;
wherein the sheet material is relatively radiantly transparent;
wherein the heating includes passing the radiant energy through the sheet before absorbing the radiant energy in the patterned tool; and
wherein the sheet material has a lower absorptivity, relative to an absorptivity of the patterned tool;
further comprising heating an additional patterned tool using the radiant energy from the radiant energy source;
wherein the heating the additional patterned tool includes directly heating the additional patterned tool without passing the radiant energy through the sheet material.

37. The method of claim 36, wherein the radiantly heating, the pressing, and the separating, are all performed as parts of a roll-to-roll process.

38. The method of claim 36, wherein the pressing the patterned tool against the sheet commences prior to the radiantly heating.

39. The method of claim 36, further comprising, after the heating, cooling the sheet;
wherein the cooling occurs prior to the separating.

40. The method of claim 36, wherein the radiant energy source includes a blackbody emitter, wherein the blackbody emitter has a temperature of at least 2000 K.

41. A method of embossing a sheet material, the method comprising:
heating a patterned tool, using radiant energy from a radiant energy source;
pressing the patterned tool against a surface of the sheet, thereby patterning the surface of the sheet; and
separating the tool from the surface;
wherein the sheet material is relatively radiantly transparent;
wherein the heating includes passing the radiant energy through the sheet before absorbing the radiant energy in the patterned tool;
wherein the sheet material has a lower absorptivity, relative to an absorptivity of the patterned tool;
wherein the heating further includes passing the radiant energy through a relatively radiantly transparent roller; and
wherein the passing the energy through the roller includes focusing the radiant energy.

42. The method of claim 36, wherein the sheet material is an oriented material that maintains its oriented character throughout the embossing.

43. The method of claim 36, wherein the pressing includes pressing patterned tools against opposite major surfaces of the sheet.

44. The method of claim 36, wherein the sheet material has a layered structure that is maintained during the heating and the pressing.

45. The method of claim 36, wherein the heating and the pressing overlap in time.

46. The method of claim 36, wherein the sheet material is constrained between belts during the heating and the pressing.

47. The method of claim 1, wherein the heating includes melting the at least part of the sheet.

* * * * *

UNITED STATES PATENT AND TRADEMARK OFFICE
CERTIFICATE OF CORRECTION

| | |
|---|---|
| PATENT NO. | : 7,416,692 B2 |
| APPLICATION NO. | : 11/047300 |
| DATED | : August 26, 2008 |
| INVENTOR(S) | : Bharadwaj et al. |

Page 1 of 1

It is certified that error appears in the above-identified patent and that said Letters Patent is hereby corrected as shown below:

Column 2, line 41, replace "425° C. to 475° C." with --425° F. to 475° F.--.

Column 2, line 42, replace "500° C." with --500° F.--.

Signed and Sealed this

Fourteenth Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,416,692 B2  Page 1 of 1
APPLICATION NO. : 11/047300
DATED : August 26, 2008
INVENTOR(S) : Mehrabi et al.

It is certified that error appears in the above-identified patent and that said Letters Patent is hereby corrected as shown below:

Title Page, Item (12) Delete, "Bharadwai et al." insert -- Mehrabi et al. --.

ON THE TITLE PAGE, Item (75) Inventors: should read in the following order:

Reza Mehrabi

Robert J. Fermin

Ali R. Mehrabi

David N. Edwards

Chunhwa Wang

Rishikesh K. Bharadwaj

Ronald F Sieloff

Philip Yi Zhi Chu

Eng-Pi Chang

Hsiao Ken Chuang

Signed and Sealed this

Seventeenth Day of February, 2009

JOHN DOLL
*Acting Director of the United States Patent and Trademark Office*